United States Patent
Schäfer et al.

(10) Patent No.: US 10,586,132 B2
(45) Date of Patent: Mar. 10, 2020

(54) MAP AND ENVIRONMENT BASED ACTIVATION OF NEURAL NETWORKS FOR HIGHLY AUTOMATED DRIVING

(71) Applicant: Visteon Global Technologies, Inc., Van Buren Township, MI (US)

(72) Inventors: Markus Schäfer, Karlsruhe (DE); Thorsten Wilmer, Bruchsal (DE); Martin Pfeifle, Seewald (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 82 days.

(21) Appl. No.: 15/864,355

(22) Filed: Jan. 8, 2018

(65) Prior Publication Data

US 2019/0213451 A1    Jul. 11, 2019

(51) Int. Cl.
| | | |
|---|---|---|
| *G06K 9/00* | (2006.01) | |
| *G06K 9/66* | (2006.01) | |
| *G06K 9/62* | (2006.01) | |
| *G06K 9/78* | (2006.01) | |
| *G06N 3/04* | (2006.01) | |

(Continued)

(52) U.S. Cl.
CPC ........... *G06K 9/66* (2013.01); *G06K 9/00805* (2013.01); *G06K 9/00818* (2013.01); *G06K 9/6227* (2013.01); *G06K 9/6267* (2013.01); *G06K 9/78* (2013.01); *G06N 3/04* (2013.01);

(Continued)

(58) Field of Classification Search
CPC .... G06K 9/00818; G06K 9/6267; G06K 9/78; G06N 3/04; G06N 3/08; G06F 16/5854; G05D 1/021

See application file for complete search history.

(56) References Cited

U.S. PATENT DOCUMENTS

| | | |
|---|---|---|
| 10,026,309 B1 * | 7/2018 | Nepomuceno ......... G08G 1/166 |
| 2012/0245832 A1 | 9/2012 | Meis et al. |

(Continued)

FOREIGN PATENT DOCUMENTS

WO    2017163538 A1    9/2017

OTHER PUBLICATIONS

International Search Report for International Application No. PCT/US2019/012873, dated Jul. 1, 2019, 3 pages.

(Continued)

*Primary Examiner* — Xin Jia
(74) *Attorney, Agent, or Firm* — Dickinson Wright PLLC

(57) ABSTRACT

A system and method for highly automated driving of a vehicle to detect and classify pedestrians and traffic signs and other vehicles are provided. The system includes an on-vehicle camera for receiving image data. A location determining module is also on the vehicle to determine a location of the vehicle and a vehicle memory unit on the vehicle storing at least one particularized convolutional neural networks to process the image data. A vehicle processor is communicatively coupled to the vehicle memory unit and the camera and the location determining module and is configured to collect vehicle location data with the location determining module. The vehicle processor is also configured to process the image data using the at least one particularized convolutional neural network based the vehicle location data and environmental conditions around the vehicle to detect and classify pedestrians and traffic signs and other vehicles.

20 Claims, 22 Drawing Sheets

(51) Int. Cl.
   *G06N 3/08*     (2006.01)
   *G06F 16/583*   (2019.01)
   *G05D 1/02*     (2020.01)

(52) U.S. Cl.
   CPC ............... *G06N 3/08* (2013.01); *G05D 1/021*
                      (2013.01); *G06F 16/5854* (2019.01)

(56) References Cited

U.S. PATENT DOCUMENTS

| | | |
|---|---|---|
| 2016/0092741 A1 | 3/2016 | Li et al. |
| 2018/0150764 A1* | 5/2018 | Stenneth ................. G06F 16/29 |
| 2019/0049987 A1* | 2/2019 | Djuric ................. G05D 1/0246 |
| 2019/0092318 A1* | 3/2019 | Mei ....................... B60W 30/09 |
| 2019/0107401 A1* | 4/2019 | Schmidt ............. G01C 21/3415 |
| 2019/0147331 A1* | 5/2019 | Arditi ................... G06N 20/00 |

OTHER PUBLICATIONS

Written Opinion for International Application No. PCT/US2019/012873, dated Jul. 1, 2019, 7 pages.

Kaiming He et al., Identity Mappings in Deep Residual Networks, Microsoft Research, Mar. 2016, 15 pages.

* cited by examiner

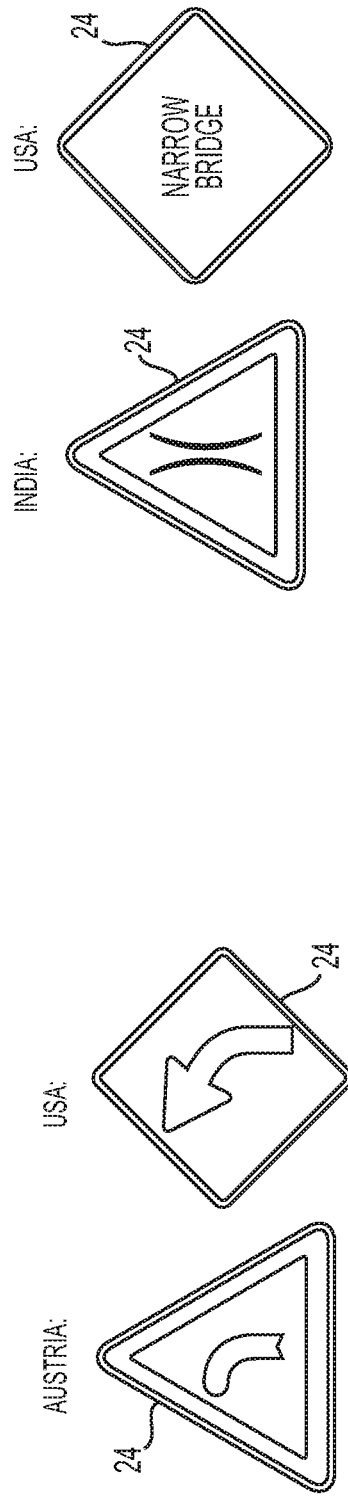
FIG. 3I
FIG. 3J
FIG. 3K
FIG. 3L

MAP AND ENVIRONMENT BASED ACTIVATION OF NEURAL NETWORKS FOR HIGHLY AUTOMATED DRIVING

BACKGROUND

Highly automated driving (HAD) has become more and more important in the automotive industry. HAD applications use various sensors (e.g., cameras, Lidar and Radar systems) to perceive the environment of the vehicle. Based on the information provided by these sensors, all kinds of dynamic road users (e.g., vehicles, pedestrians and bicycles) as well as static objects such as signs, road markings can be detected.

Although many current ADAS (advanced driver assistance) applications are based on traditional techniques mainly using computer vision algorithms, other machine learning techniques, especially neural networks and variants of neural networks such as CNNs (convolutional neural networks) or RCNNs (region convolutional neural networks) are increasingly employed.

In particular, RCNNs processing camera information are regarded as state-of-the-art systems for detecting, classifying and localizing dynamic and static road objects. The quality of the detection, classification and localization of objects heavily depends on many different factors, such as the underlying neural network structure or the training data used for training the parameters of the neural network. The training is a very time-consuming process which can take place offline on servers and which requires labeled training data. Labeled training data consists of both the sensor data (e.g. camera image) and classification and localization information, (e.g., bounding boxes around vehicles or pedestrians). After the training is completed, the neural network consisting of code and configuration data is then deployed to the HAD unit in the vehicle. The neural network in the vehicle then allow the online detection, classification and localization of static and dynamic road users from camera image streams in real time. Such a process is depicted in FIG. 1.

SUMMARY

This section provides a general summary of the disclosure and is not a comprehensive disclosure of its full scope or all of its features, aspects or objectives.

According to an aspect of the disclosure, a system for highly automated driving of a vehicle to detect and classify pedestrians and traffic signs and other vehicles is provided. The system includes a camera disposed on the vehicle for receiving image data near the vehicle. A location determining module is also disposed on the vehicle to determine a location of the vehicle. The system also includes a vehicle memory unit disposed on the vehicle storing at least one particularized convolutional neural networks to process the image data. A vehicle processor is disposed on the vehicle and communicatively coupled to the vehicle memory unit and the camera and the location determining module and is configured to collect vehicle location data with the location determining module. The vehicle processor is also configured to process the image data using the at least one particularized convolutional neural network based the vehicle location data and environmental conditions around the vehicle to detect and classify at least one of pedestrians and traffic signs and other vehicles.

According to another aspect of the disclosure, a method for detecting and classifying pedestrians and traffic signs and other vehicles is also provided. The method includes the step of receiving image data near the vehicle using a camera disposed on a vehicle using a vehicle processor communicatively connected to the camera. The method continues with the step of determining a location of the vehicle with a location determining module disposed on the vehicle and communicatively connected to the vehicle processor using the vehicle processor. The method proceeds by collecting vehicle location data with the location determining module using the vehicle processor and a vehicle memory unit coupled to the vehicle processor and disposed on the vehicle. The method also includes the step of storing at least one particularized convolutional neural network in the vehicle memory unit. The method continues with processing the image data using the at least one particularized convolutional neural network based the vehicle location data and environmental conditions around the vehicle using the vehicle processor. The method then includes the step of detecting and classifying at least one of pedestrians and traffic signs and other vehicles using the vehicle processor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein:

FIGS. 3A-3L illustrate various traffic signs which have the same meaning, but look completely different in various countries according to aspects of the disclosure;

DETAILED DESCRIPTION

Figure 1:
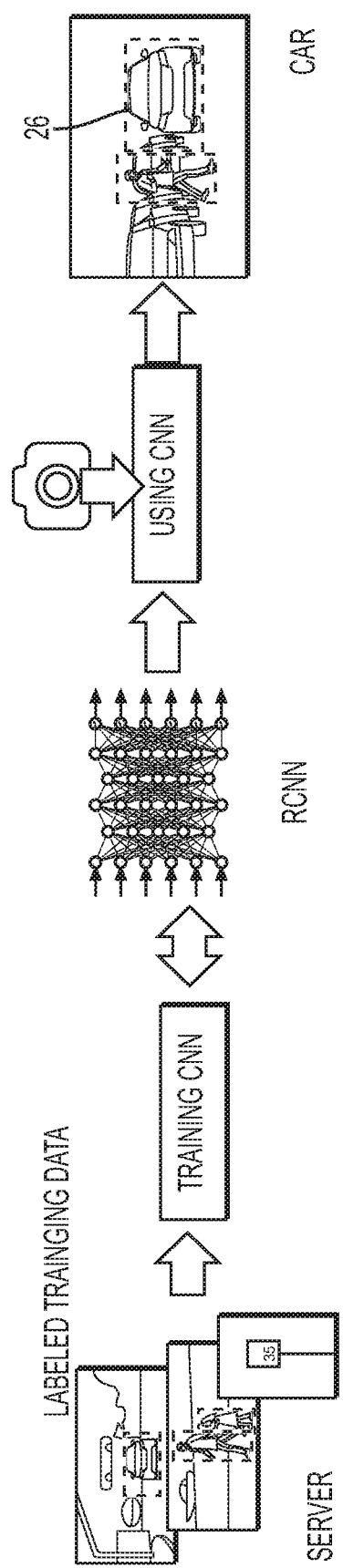
FIG. 1 illustrates a neural network providing online detection, classification and localization of static and dynamic road users from camera image streams according to aspects of the disclosure.
Figure 2:
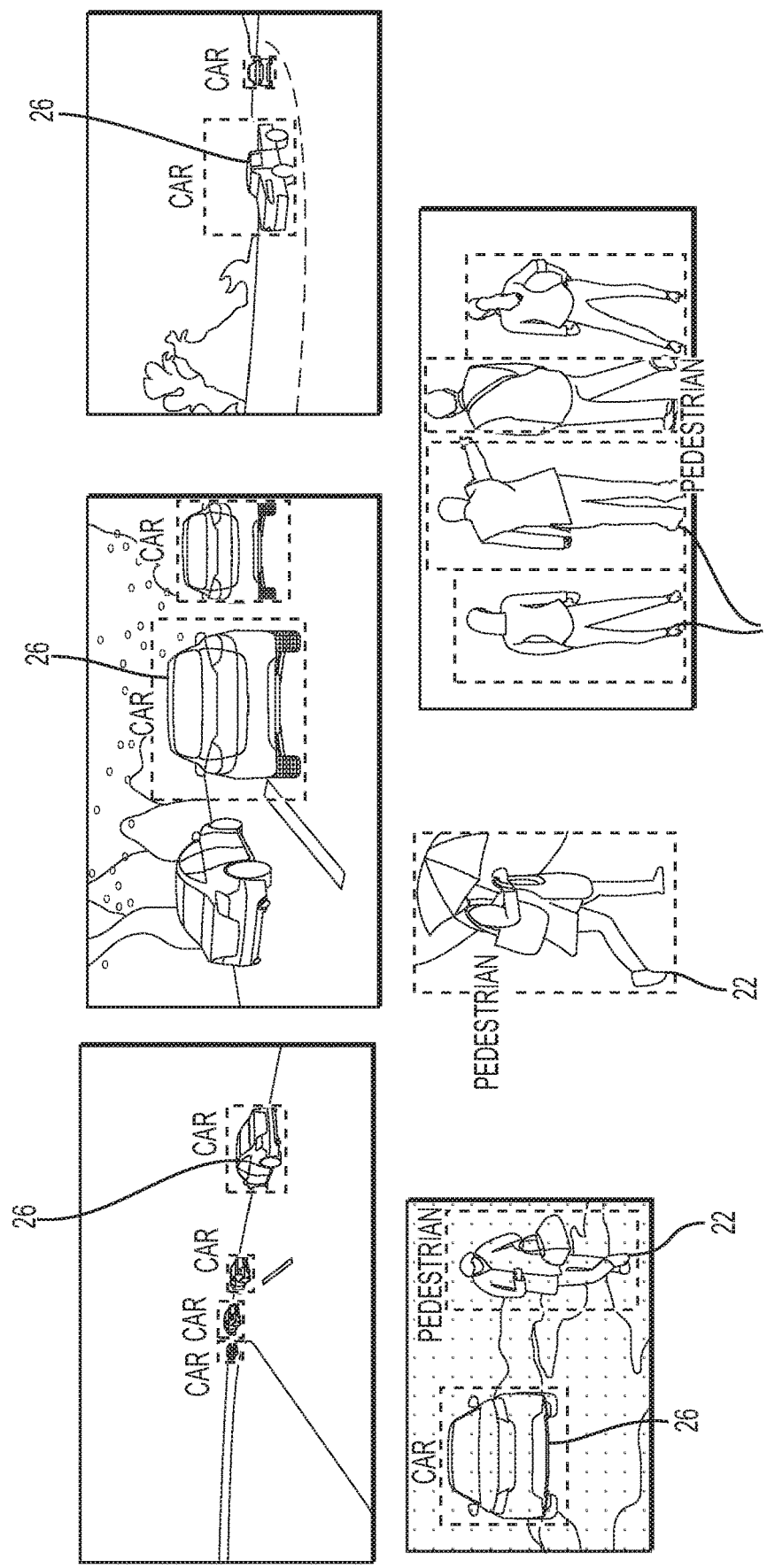
FIG. 2 illustrates the classification of vehicles and pedestrians for various lighting and weather conditions according to aspects of the disclosure.
Figure 3B:
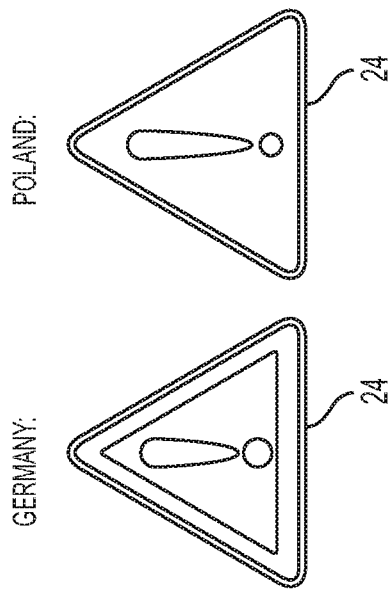
Figure 3D:
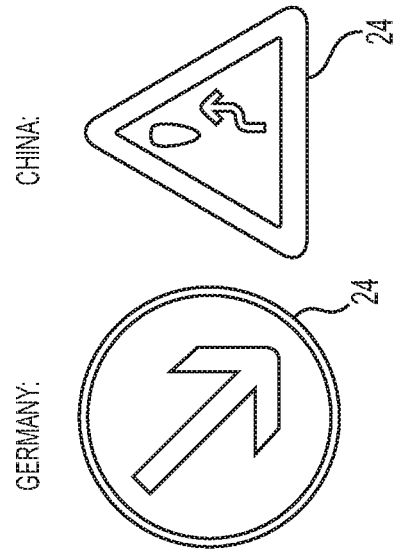
Figure 3A:
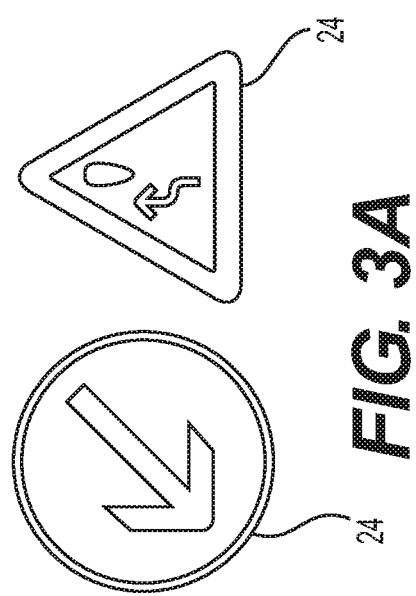
Figure 3C:
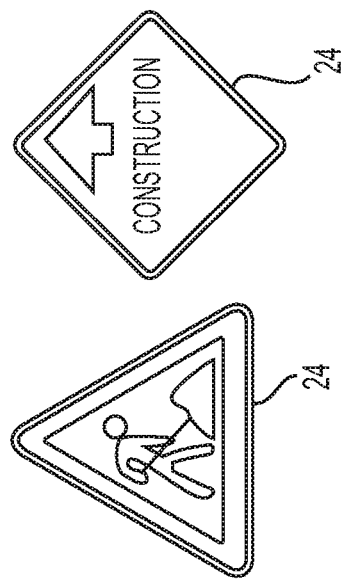
Figure 3F:
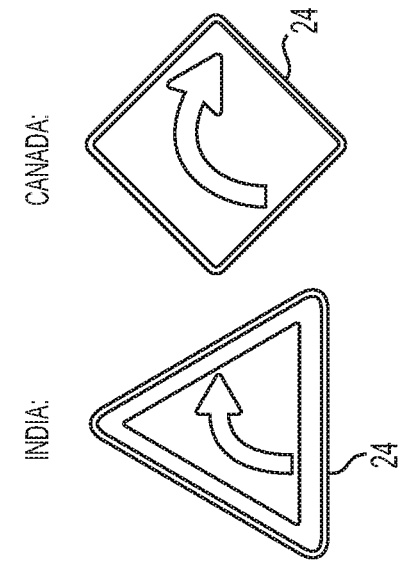
Figure 3E:
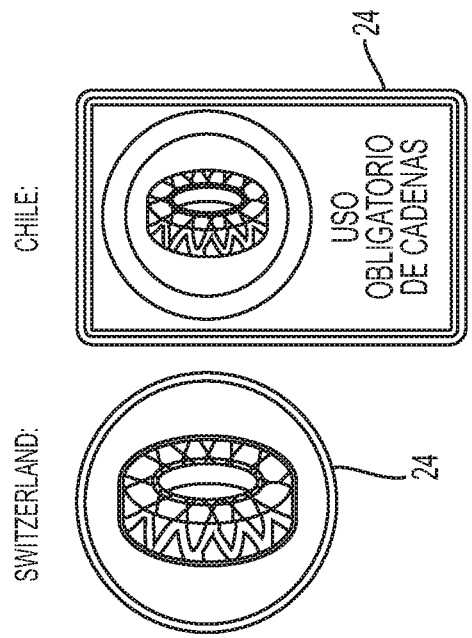
Figure 3H:
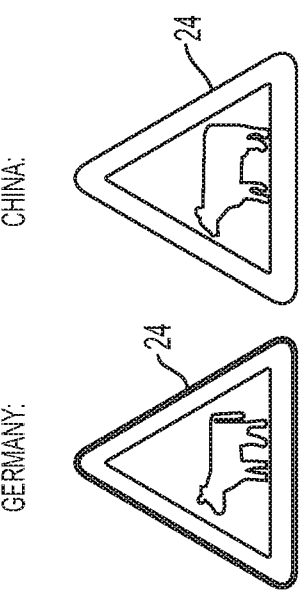
Figure 3G:
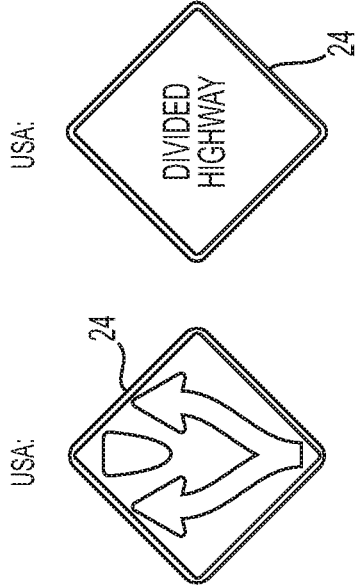

Detection, classification and localization for various weather, light and regional condition is very difficult to achieve. FIG. 2, for instance, depicts the classification of vehicles for low light (top-left), for rain (top-middle) and for sunset (top-right). Not only is vehicle detection difficult for these scenarios, but also the detection of pedestrians. If it is raining, the umbrellas might cover faces and in winter the pedestrians might look completely different than in summer due to the different clothes they are wearing, as shown in FIG. 2.

The classification of road users is not only rendered complicated due to varying weather and light conditions, but also due to regional differences. FIGS. 3A-3L, for instance, depict various traffic signs which have the same meaning but might look completely different in various countries. As the classification, detection and localization of traffic signs is crucial for highly automated driving, it is important that these signs be classified correctly for all countries.

Figure 4:
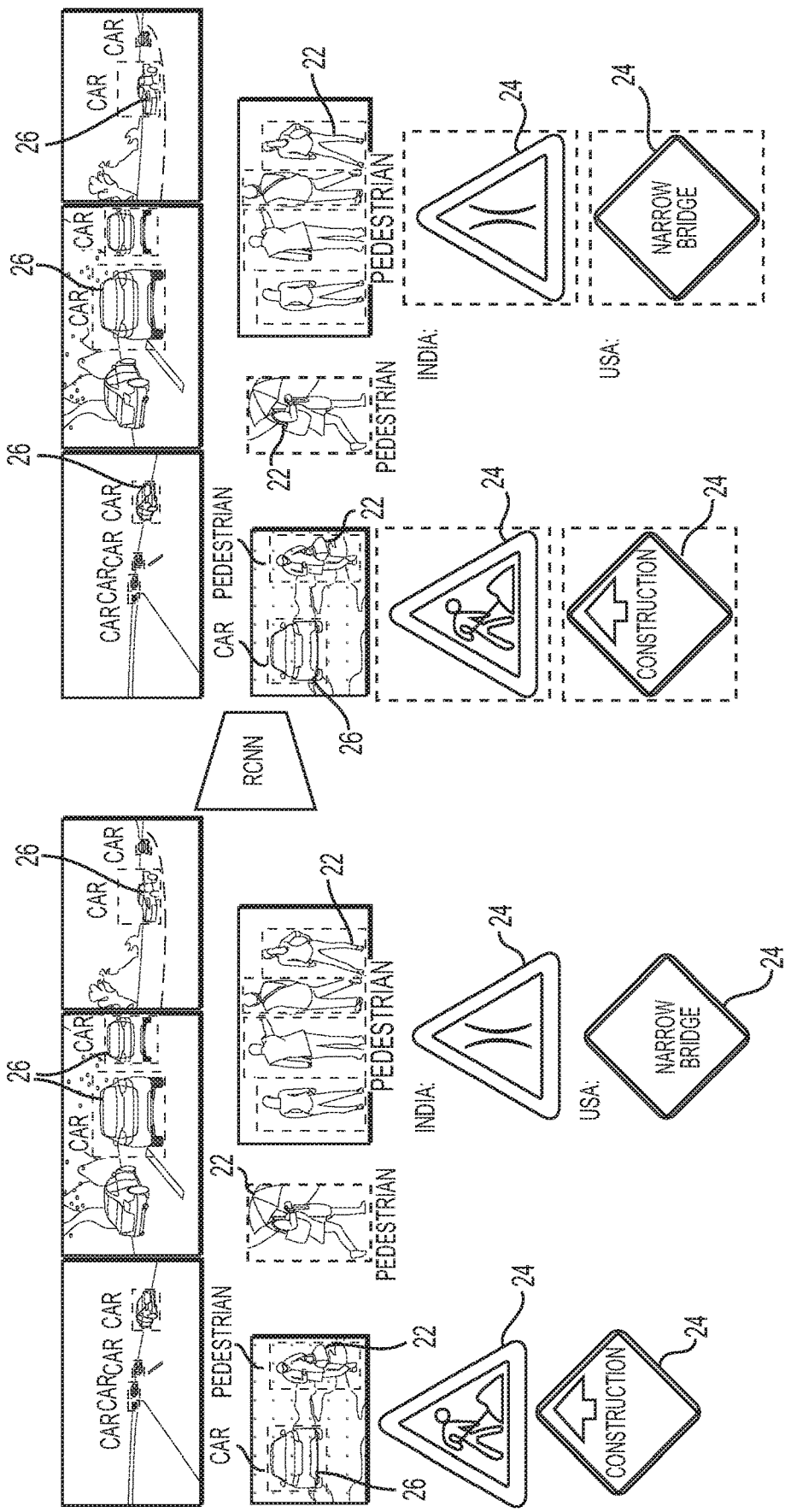
FIG. 4 illustrates using all kinds of different training data to train a neural network, according to aspects of the disclosure.

The most straightforward approach to solving this problem is to use all kinds of different training data to train a neural network, as shown in FIG. 4. The neural network will learn that, for instance, signs which look completely different still need to be recognized/classified as the same sign class. Similarly, other vehicles and pedestrians will more or less accurately be recognized in various weather and daylight conditions.

Using this approach, it is obviously very hard to achieve high precision and recall values for classification. Even for humans it is hard to learn that different-looking signs (e.g., "construction" or "narrow bridge" signs) may have the same meaning. Similarly, it can be difficult for neural networks to achieve high accuracy values.

Furthermore, as this approach requires the neural network to learn and remember a lot of different things at the same time, the resulting program and parameterization parameters (reflecting the structure, the weights and biases of the network) are rather complex, consequently require a lot of space and, furthermore, result in rather high response times for detection, classification and localization. In summary, such an approach has the following disadvantages: rather bad accuracy, rather high runtime and rather high space consumption.

Modern self-driving vehicles typically rely heavily on machine learning algorithms, especially on CNNs (Convolutional Neural Networks). CNNs are used for classifying/ detecting vehicles, pedestrians, bicycles, traffic signs and other objects. There are several architectures in the field of Convolutional Networks that have a name. The most common includes LeNet. LeNet is one of the first successful applications of Convolutional Neural Networks developed by Yann LeCun in the 1990s. Of these, the best known is the LeNet architecture that was used to read zip codes, and digits. AlexNet developed by Alex Krizhevsky, llya Sutskever and Geoff Hinton is another example and was the first work that popularized Convolutional Networks in Computer Vision. AlexNet. The AlexNet was submitted to the ImageNet ILSVRC challenge in 2012 and significantly outperformed the second runner-up (top 5 error of 16% compared to runner-up with 26% error). The Network had a very similar architecture to LeNet, but was deeper, bigger, and featured Convolutional Layers stacked on top of each other (previously it was common to only have a single Convolutional layer always immediately followed by a POOL layer. Another example of CNNs is ZF Net (short for Zeiler & Fergus Net) by Matthew Zeiler and Rob Fergus, which was the ILSVRC 2013 winner was a Convolutional Network. ZF Net was an improvement on AlexNet by tweaking the architecture hyperparameters, in particular by expanding the size of the middle convolutional layers and making the stride and filter size on the first layer smaller. Yet another example is GoogLeNet by Szegedv et al. from Google, which was the ILSVRC 2014 winner. Its main contribution was the development of an Inception Module that dramatically reduced the number of parameters in the network (4M, compared to AlexNet with 60M). This disclosure uses Average Pooling instead of Fully Connected layers at the top of the ConvNet, eliminating a large amount of parameters that do not seem to matter much. There are also several follow-up versions to the GoogLeNet, most recently Inception-v4. VGGNet is another example of a CNN and was a runner-up in ILSVRC 2014 was the network from Karen Simonyan and Andrew Zisserman. Its main contribution was in showing that the depth of the network is a critical component for good performance. The VGGNet final best network contains 16 CONV/FC layers and, appealingly, features an extremely homogeneous architecture that only performs 3×3 convolutions and 2×2 pooling from the beginning to the end. The VGGNet pretrained model is available for plug and play use in Caffe. A downside of the VGGNet is that it is more expensive to evaluate and uses a lot more memory and parameters (140M). Most of these parameters are in the first fully connected layer, and it was since found that these FC layers can be removed with no performance downgrade, significantly reducing the number of necessary parameters. Residual Network (ResNet) is an additional example of a CNN. Residual Network developed by Kaiming He et al. was the winner of ILSVRC 2015. It features special skip connections and a heavy use of batch normalization. The architecture is also missing fully connected layers at the end of the network. ResNets are currently by far the most state-of-the-art Convolutional Neural Network models and are the default choice for using ConvNets in practice (as of May 10, 2016). In particular, there have been more recent developments that tweak the original architecture from Kaiming He et al. including *Identity Mappings in Deep Residual Networks* (published March 2016).

Figure 5:
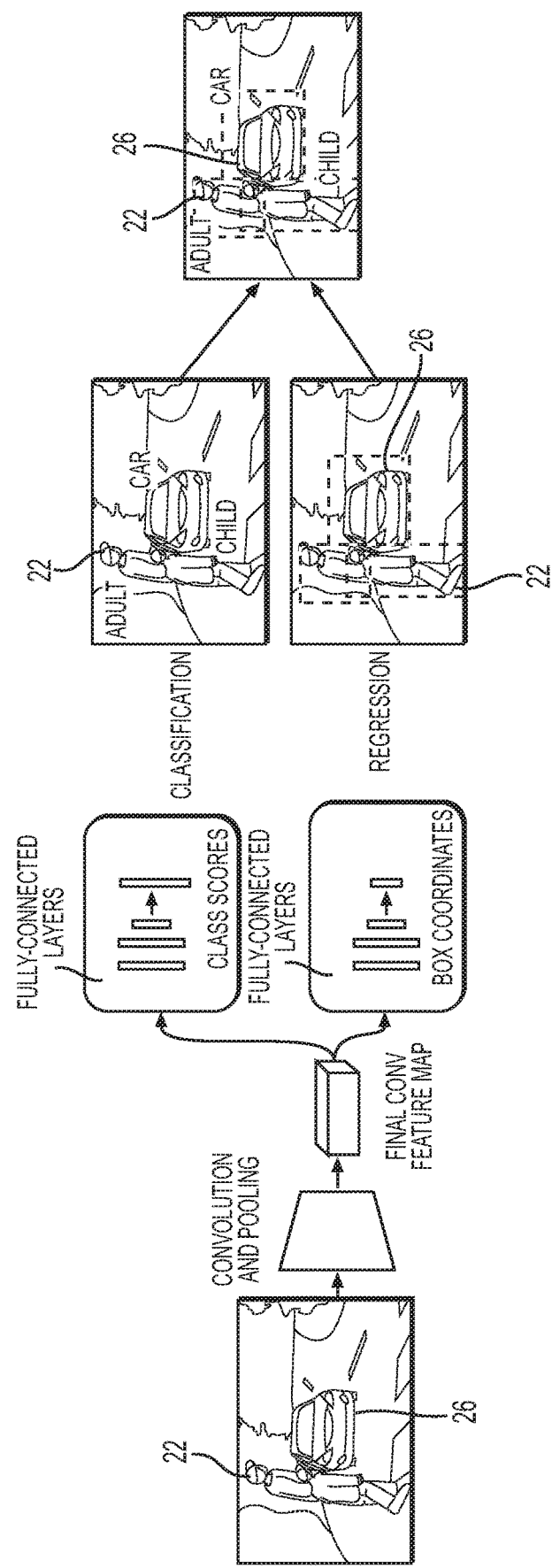
FIG. 5 illustrates object classification and object localization using neural networks according to aspects of the disclosure.

In addition to the pure classification, it is possible to use neural networks also for determining the bounding boxes around objects. This process is often called regression. FIG. 5 shows an exemplary architecture which allows both object classification and object localization. Parts of the architecture are shared and parts are specific to object classification and to object localization, also called regression. This technique is often referred to as RCNN (Regions+CNN). Currently RCNNs are used for detecting various road objects and their spatial position and extension.

Figure 6:
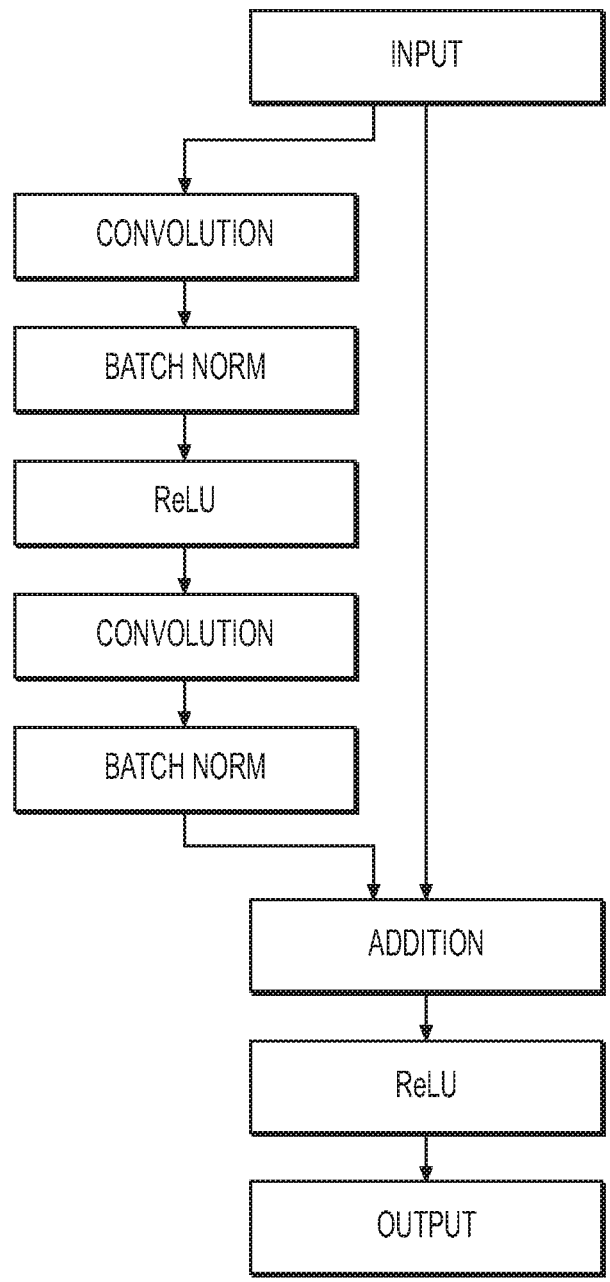
FIG. 6 illustrates a ResNet neural network with a skip connection parallel to convolutional layers according to aspects of the disclosure.
Figure 7:
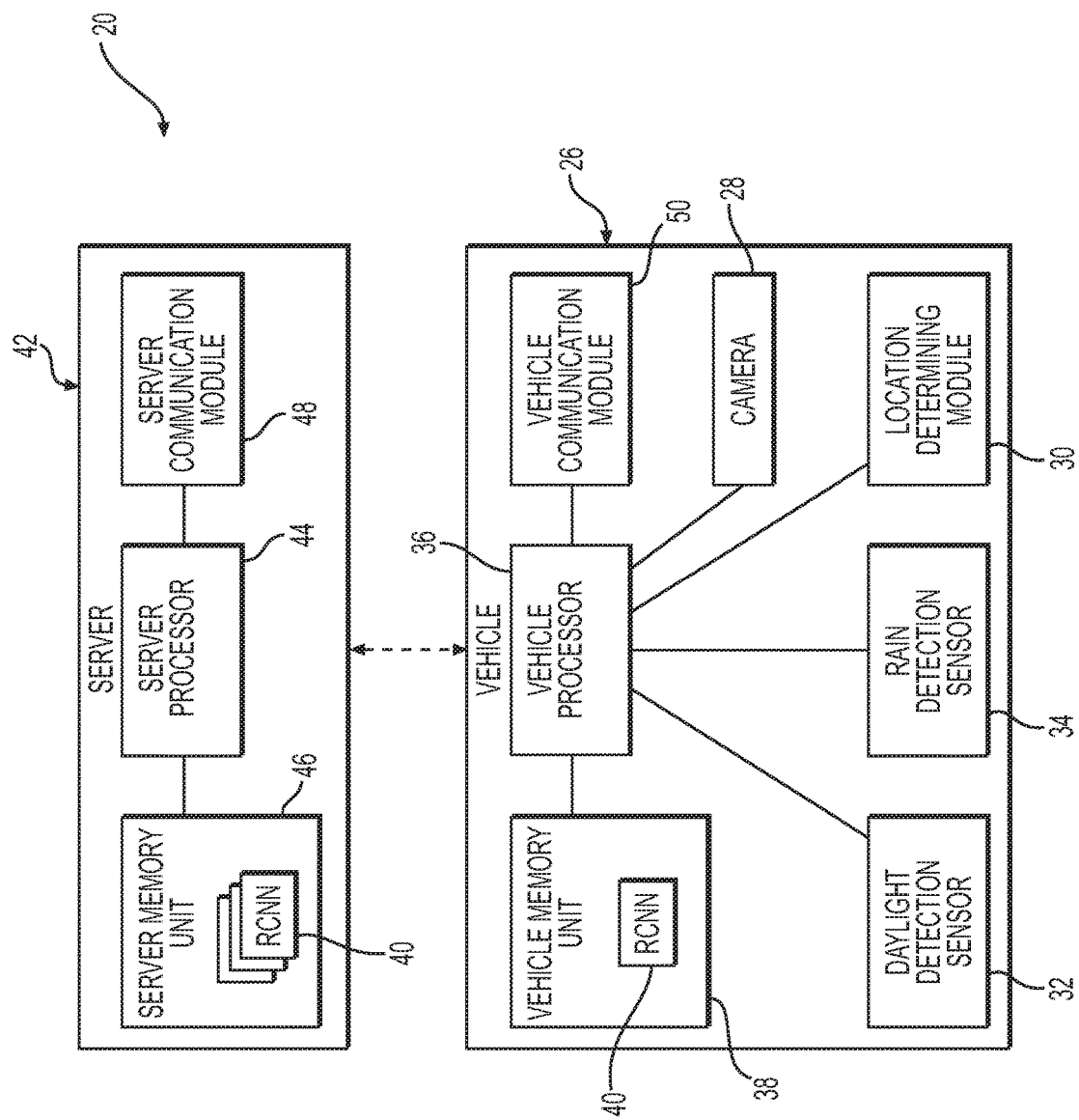
FIG. 7 is a block diagram of a system for highly automated driving of a vehicle 26 to detect and classify pedestrians and traffic signs and other vehicles according to aspects of the disclosure.

Deep neural networks demonstrate high performance on image classification tasks while being more difficult to train. Due to the complexity and vanishing gradient problem, it normally takes a lot of time and more computational power to train deeper neural networks. Deep residual networks (ResNets) can make the training process faster and attain more accuracy compared to their equivalent neural networks. ResNets achieve this improvement by adding a simple skip connection parallel to convolutional layers (FIG. 6). Such a skip connection parallel to convolutional layers" can be used in RCNNs as well.

Thus, there is a need for an improved systems and methods for providing a reliable solution for classification, detection and localization of road users and traffic signs independent of region or weather and light conditions.

A system 20 for highly automated driving of a vehicle 26 to detect and classify pedestrians 22 and traffic signs 24 and other vehicles 26 is provided in FIGS. 7-14, wherein like numerals indicate corresponding parts throughout the several views. The system 20 includes a camera 28 disposed on the vehicle 26 for receiving image data near the vehicle 26. The system 20 also includes a location determining module 30 disposed on the vehicle 26 to determine a location of the vehicle 26. The system 20 can also include a plurality of environmental sensors 32, 34 including a daylight detection sensor 32 and a rain detection sensor 34 disposed on the vehicle 26 and in communication with the vehicle processor 36. The plurality of environmental sensors 32, 34 sense the environmental conditions around the vehicle 26 and output vehicle environmental data. It is recognized that sensors 32, 34 utilized in the area of highly automated driving (HAD) include cameras 28, lidar, radar, ultra-sonic, inertial measurement unit (IMU), etc. However, object detection and classification can be improved considerably by exploiting more traditional "sensors" like digital maps (i.e., location), rain-, snow- and light-detection sensors 32, 34, as set forth herein. Nevertheless, it should be understood that while more traditional "sensors" like digital maps, rain-, snow- and light-detection sensors 32, 34 are primarily discussed as part of the system 20, other sensing technologies, such as lidar and/or radar data can be used to augment location data and data from the plurality of environmental sensors 32, 34.

The system 20 additionally includes a vehicle memory unit 38 disposed on the vehicle 26 storing at least one particularized convolutional neural networks 40 to process the image data. A vehicle processor 36 is also disposed on the vehicle 26 and is communicatively coupled to the vehicle memory unit 38 and the camera 28 and the location determining module 30. The vehicle processor 36 is configured to collect vehicle 26 location data with the location determining module 30. The vehicle processor 36 is also configured to process the image data using the at least one particularized convolutional neural network 40, based the vehicle 26 location data and environmental conditions around the vehicle 26 to detect and classify at least one of pedestrians 22 and traffic signs 24 and other vehicles 26.

The at least one particularized convolutional neural network 40 can include a plurality of particularized convolutional neural networks 40 (e.g., stored in the vehicle memory unit 38). In such a case, the vehicle processor 36 is further configured to determine whether it is raining using the vehicle 26 environmental data from the plurality of environmental sensors 32, 34. The vehicle processor 36 can also be configured to determine a time of day using the vehicle 26 environmental data from the plurality of environmental sensors 32, 34. Additionally, the vehicle processor 36 may be configured to select one of the plurality of particularized convolutional neural networks 40 to use for the processing of the image data based on the determination of whether it is raining and the time of day and the vehicle location data.

Figure 8:
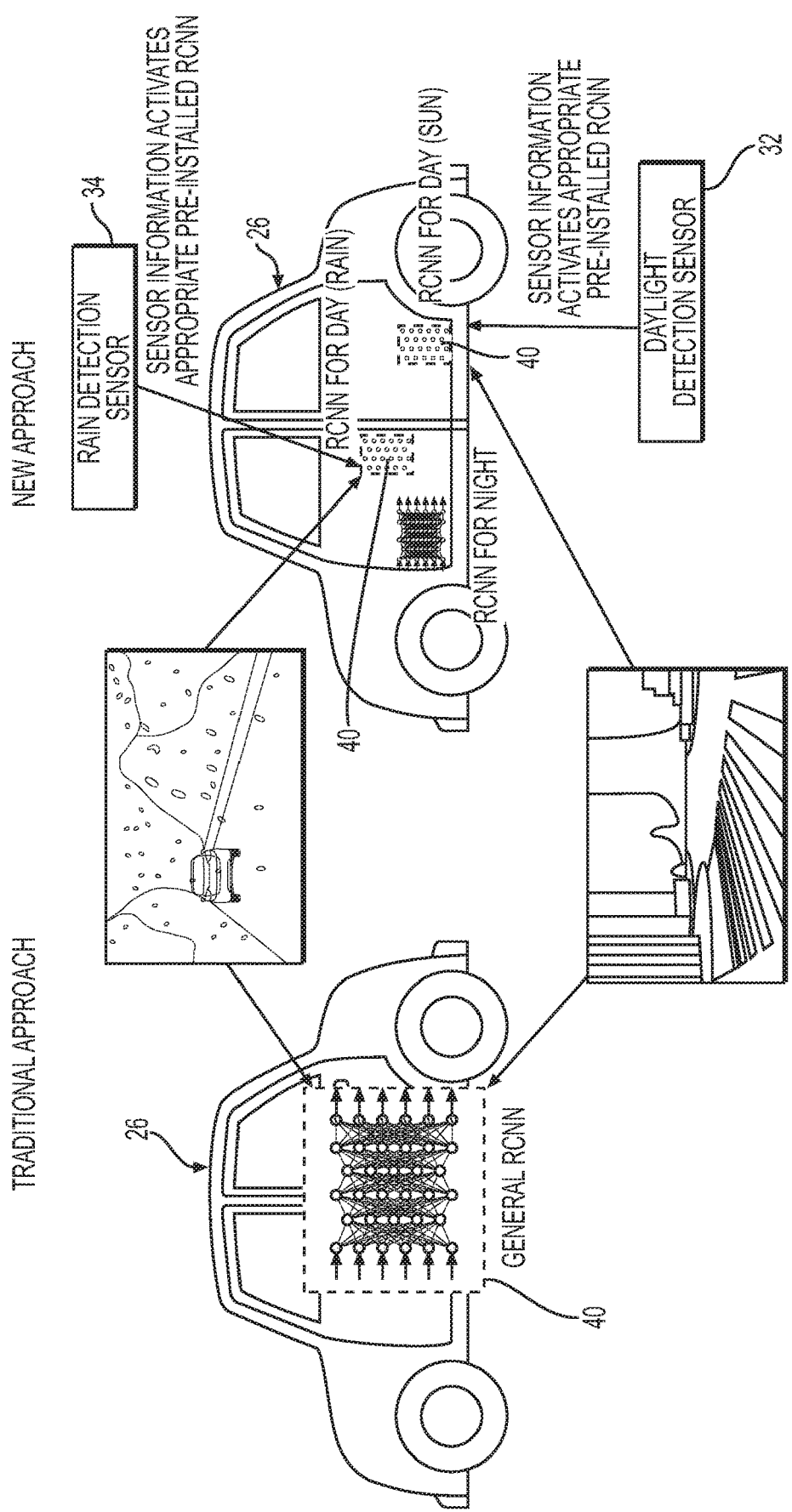
FIG. 8 illustrates a vehicle with at least one particularized convolutional neural network to process image data according to aspects of the disclosure.

Therefore, a set of region and environment specific neural networks (i.e., the plurality of particularized convolutional neural networks 40) are created and the plurality of particularized convolutional neural networks 40 are activated based on the information provided by non-HAD sensors 32, 34, such as digital maps (i.e., vehicle location data), daylight detection sensor 32, or rain detection sensor 34. So, in the vehicle 26, small tailor-made CNNs (i.e., the plurality of particularized convolutional neural networks 40) can be stored and/or pre-installed and get activated based similar logic described above for traditional sensors 32, 34. At any given time, only one of the plurality of particularized convolutional neural networks 40 is active, as best shown in FIG. 8. So, instead of training one of the plurality of particularized convolutional neural networks 40, a set of the plurality of particularized convolutional neural networks 40 is trained and the right one is activated in the vehicle 26 based on sensor (i.e., from the plurality of environmental sensors 32, 34) and digital map information (i.e., vehicle location data). For instance, one of the plurality of particularized convolutional neural networks 40 is trained only with night images and another of the plurality of particularized convolutional neural networks 40 only with day images. All of the resulting plurality of particularized convolutional neural networks 40 can be available in the vehicle 26. Which one is activated can be decided in the same way as for instance navigation systems 20 activate night or day view. Similarly, one of the plurality of particularized convolutional neural networks 40 can be trained only with rain images and another of the plurality of particularized convolutional neural networks 40 is only trained with cloud images and yet another one which was only trained with sun images. Depending on the readings from the daylight detection sensor 32, the right one of the plurality of particularized convolutional neural networks 40 is activated.

As a lot of traffic signs 24 are country-specific (FIGS. 3A-3L), it can be beneficial to create the plurality of particularized convolutional neural networks 40 that are for the different countries. The country which the vehicle 26 is currently located in can be determined based on the vehicle location data available in the vehicle 26 (e.g., based on the combination of Global Navigation Satellite System (GNSS) information and navigation maps). Therefore, the right one of the plurality of particularized convolutional neural networks 40 for the specific country can be activated. Likewise, for example, in the United States, the plurality of particularized convolutional neural networks 40 can be created with some being state specific. However, it should be appreciated that other categories or divisions of the plurality of particularized convolutional neural networks 40 may be beneficial besides those that are administratively divided. The plurality of particularized convolutional neural networks 40 could also be created only for urban areas (e.g., cities, and other ones for rural areas or for highways) as road users or pedestrians 22 and traffic signs 24 might differ considerably for these situations. Again, based on the information provided by the digital map, the system 20 knows whether it is in an urban area or on a controlled-access road. So, the plurality of particularized convolutional neural networks 40 might even be road-type dependent and could be activated based on digital map information.

It might also well be the case that one of the plurality of particularized convolutional neural networks 40 which is used on a highway is faster for classification, detection and localization than one of the plurality of particularized convolutional neural networks 40 intended for an urban city environment. One of the plurality of particularized convolutional neural networks 40 that is fast for highways is necessary as the speed of the vehicles is higher in these situations, so it can be necessary to evaluate more frames per second in order to get to the same frames per meter ratio. On the other hand, one of the plurality of particularized convolutional neural networks 40 for an urban/city environment can detect a much larger number of objects. It is probably helpful to have two of the plurality of particularized convolutional neural networks 40 that are different for these two different situations. As the training sets are rather specific, it is likely that the resulting plurality of particularized convolutional neural networks 40 will be much smaller than the generic one, and consequently, will result in a better runtime performance and classification precision.

Referring back to FIG. 7, the system 20 can additionally include a server 42 disposed remotely from the vehicle 26. The server 42 has a server processor 44 coupled to a server memory unit 46 and server communication module 48. Additionally, the system 20 can also include a vehicle communication module 50 disposed on the vehicle 26 that is in communication with the vehicle processor 36 to communicate with the server 42. Consequently, the vehicle processor 36 is further configured to communicate the location of the vehicle 26 to the server 42 with the vehicle communication module 50. Consequently, the vehicle 26 could only send its spatial location to the server 42 and the server 42 can do map matching (i.e., assign the vehicle 26 to the correct road), evaluate weather conditions in this area and then send the most appropriate one of the plurality of particularized convolutional neural networks 40 to the vehicle 26. Note that the activation of an appropriate one of the plurality of particularized convolutional neural networks 40 could also be based on cloud information (i.e., information on the server 42). For instance, a service could inform the vehicle 26 about the region the vehicle 26 is in. But the communication channel (e.g., vehicle-to-everything) can also be used for transferring one of the plurality of particularized convolutional neural networks 40 that is small and tailor-made from the cloud to the vehicle 26. In other words, the vehicle 26 does not necessarily need to have all the plurality of particularized convolutional neural networks 40 that are possibly used pre-installed, but could rather request the most appropriate one from a server 42.

Figure 9:
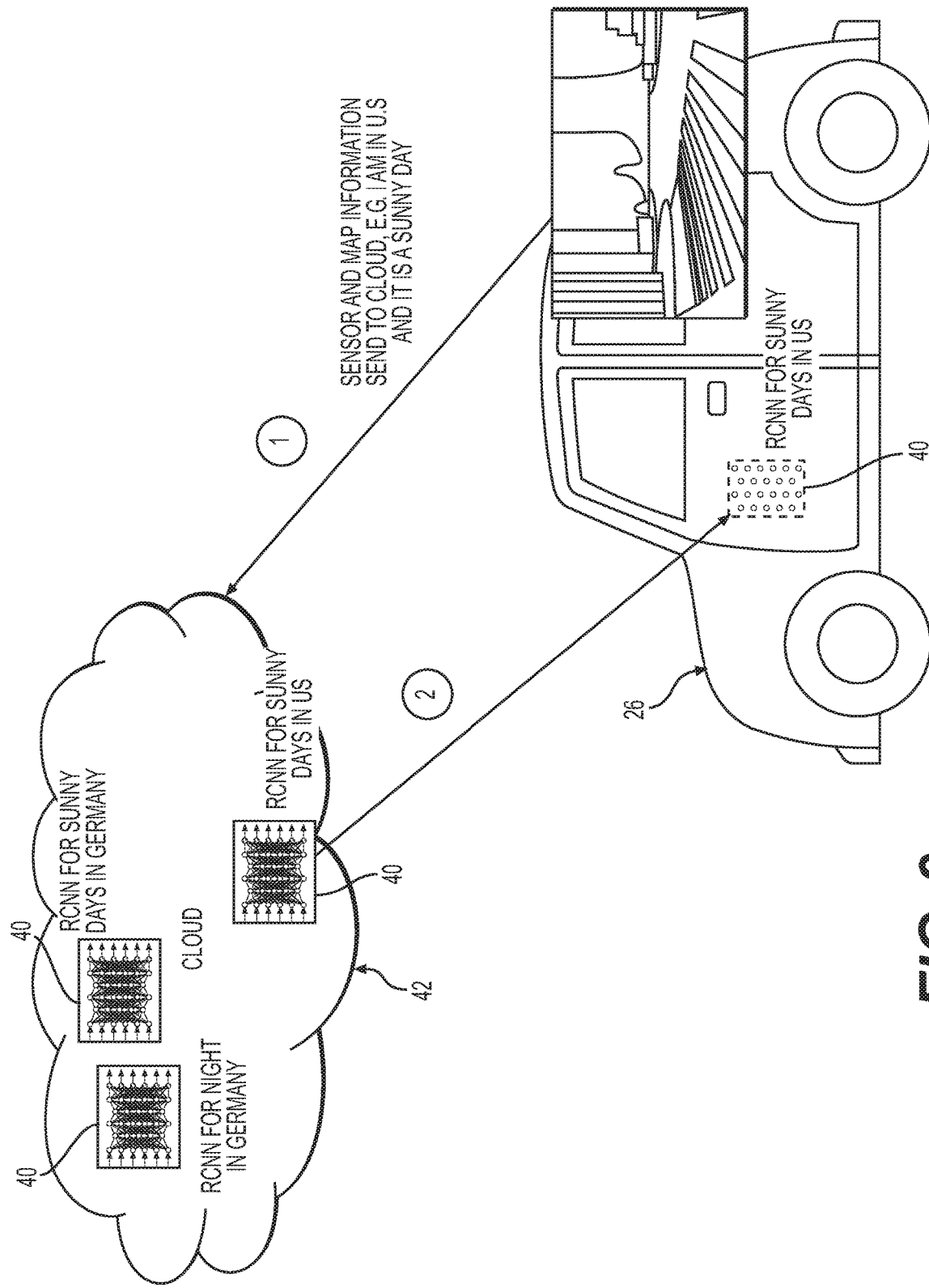
FIG. 9 illustrates a vehicle in communication with a server disposed remotely from the vehicle to send the at least one particularized convolutional neural network to the vehicle according to aspects of the disclosure.

Thus, the vehicle 26 can send its spatial location and the information from daylight detection sensors 32, rain detection sensor 34, etc. to the server 42. Based on this information, the server 42 could provide the most appropriate one of the plurality of particularized convolutional neural networks 40. This process is depicted in FIG. 9. Specifically, myriad specific purpose CNNs (i.e., plurality of particularized convolutional neural networks 40) covering all kind of environmental situations can be stored in the cloud. The vehicle 26 sends its sensor information (day, night, rainy, sunny, cloudy) and map information (country, FRC) to the cloud or server 42 and the server 42 sends the most appropriate one of the plurality of particularized convolutional neural networks 40 back to the vehicle 26 for this situation.

Therefore, the vehicle processor 36 is also configured to receive the at least one particularized convolutional neural network 40 from the server 42 with the vehicle communication module 50 in response to communicating the location of the vehicle 26 to the server 42. According to an aspect, the communication with the server 42 is carried out using vehicle-to-everything (V2X) technology; however, it should be appreciated that other communication technology may be used instead.

As indicated above, the at least one particularized convolutional neural network 40 can include a plurality of particularized convolutional neural networks 40. The plurality of particularized convolutional neural networks 40 may be stored in the server memory unit 46. The vehicle processor 36 is configured to communicate the environmental conditions around the vehicle 26 to the server 42 and the server processor 44 is configured to determine whether it is raining using the vehicle 26 environmental data from the plurality of environmental sensors 32, 34. Additionally, the server processor 44 is configured to determine a time of day using the vehicle 26 environmental data from the plurality of environmental sensors 32, 34. The server processor 44 is also configured to select one of the plurality of particularized convolutional neural networks 40 to use for the processing of the image data based on the determination of whether it is raining and the time of day and the vehicle 26 location data. So, the server 42 could use discrete information such as Country (US), Day (YES/NO), Rain (YES/NO), and select one of the plurality of particularized convolutional neural networks 40 which was trained exactly with this data. For example, the server processor 44 might carry out an operation like "SELECT RCNN FROM All Possible RCNNs WHERE Country='US' AND RAIN='YES' and DAY/NIGHT='DAY'. The server processor 44 can also be configured to send the one of the plurality particularized convolutional neural networks 40 that is selected to the vehicle 26 with the server communication module 48. Thus, the vehicle memory unit 38 would only need to store one of the plurality of particularized convolutional neural networks 40 at a time.

The server 42 can also track the vehicle 26, and send a new one of the plurality of particularized convolutional neural networks 40 whenever it detects that a new one would be beneficial due to environmental changes (e.g., the vehicle 26 moving from a highway into a city). Similarly, the server processor 44 can be configured to determine what type of roads the vehicle 26 traveling on using the vehicle location data. In such a situation, the selection of one of the plurality of particularized convolutional neural networks 40 to use for the processing of the image data based is further based on what type of roads the vehicle 26 traveling on.

In addition, in order for the server 42 to detect the most suitable one of the plurality of particularized convolutional neural networks 40, the server processor 44 can also be configured to determine what country the vehicle 26 is located in using the vehicle location data. Therefore, the determination of which of the plurality of particularized convolutional neural networks 40 to use for the processing of the image data can further based on what country the vehicle 26 is located in.

The vehicle 26 location data may also include vehicle route information and so the server processor 44 can be configured to determine anticipated changes to the one of the plurality of particularized convolutional neural networks 40 to use for the processing of the image data based on the vehicle route information. In other words, the vehicle 26 can send the route path computed by a navigation system (e.g., location determining module 30) to the server 42 and the server 42 could send the most appropriate one of the plurality of particularized convolutional neural networks 40 for this route path to the vehicle 26 in response. The server processor 44 can select another one of the plurality of particularized convolutional neural networks 40 to use for the processing of the image data based on the determination of whether it is raining and the time of day and the anticipated changes determined. So, the server processor 44 can be configured to send another one of the plurality particularized convolutional neural networks 40 that is selected to the vehicle 26 with the server communication module 48.

The server 42 may also select a handful of the plurality of particularized convolutional neural networks 40 that may be possibly used and then select the most suitable one of the plurality of particularized convolutional neural networks 40 based on a set of test images reflecting the map and environmental situation of the vehicle 26. These images could be available in a big database or could be generated on the fly based on simulation systems 20. Thus, the vehicle processor 36 can also be configured to communicate the image data to the server 42. Accordingly, the server processor 44 is configured to determine whether it is raining using the image data from the camera 28. The server processor 44 can also be configured to determine a time of day using the image data from the camera 28 and select one of the plurality of particularized convolutional neural networks 40 to use for the processing of the image data based on the determination of whether it is raining and the time of day and the vehicle 26 location data. The server processor 44 can then send the one of the plurality particularized convolutional neural networks 40 that is selected to the vehicle 26 with the server communication module 48. Specifically, the server memory unit 46 can include a database of comparison image data and the selection of one of the plurality of particularized convolutional neural networks 40 to use for the processing of the image data by the server processor 44 includes comparing the image data to the comparison image data. In other words, for the handful of the plurality of particularized convolutional neural networks 40 that are candidates, the accuracy for the test set is computed and the one of the plurality of particularized convolutional neural networks 40 scoring highest is sent to the vehicle 26.

Because, the vehicle processor 36 can communicate the image data to the server 42, the server processor 44 may also be configured to train the at least one particularized convolutional neural network 40 using the image data from the camera 28 "on-the-fly". So, the generated images (i.e., image data) or the images selected from a big database can be used to train one of the plurality of particularized convolutional neural networks 40. The trained one of the plurality of particularized convolutional neural networks 40 might not necessarily be trained from scratch, but one of the plurality of particularized convolutional neural networks 40 that already exists could be used as a foundation. This one of the plurality of particularized convolutional neural networks 40 may be known to work well and could be fine-trained for the specific situation resulting in one of the plurality of particularized convolutional neural networks 40 which performs excellently for the current situation of the vehicle 26. After training, the server processor 44 can send the at least one particularized convolutional neural network 40 that is trained to the vehicle 26 using the server communication module 48.

Figure 10:
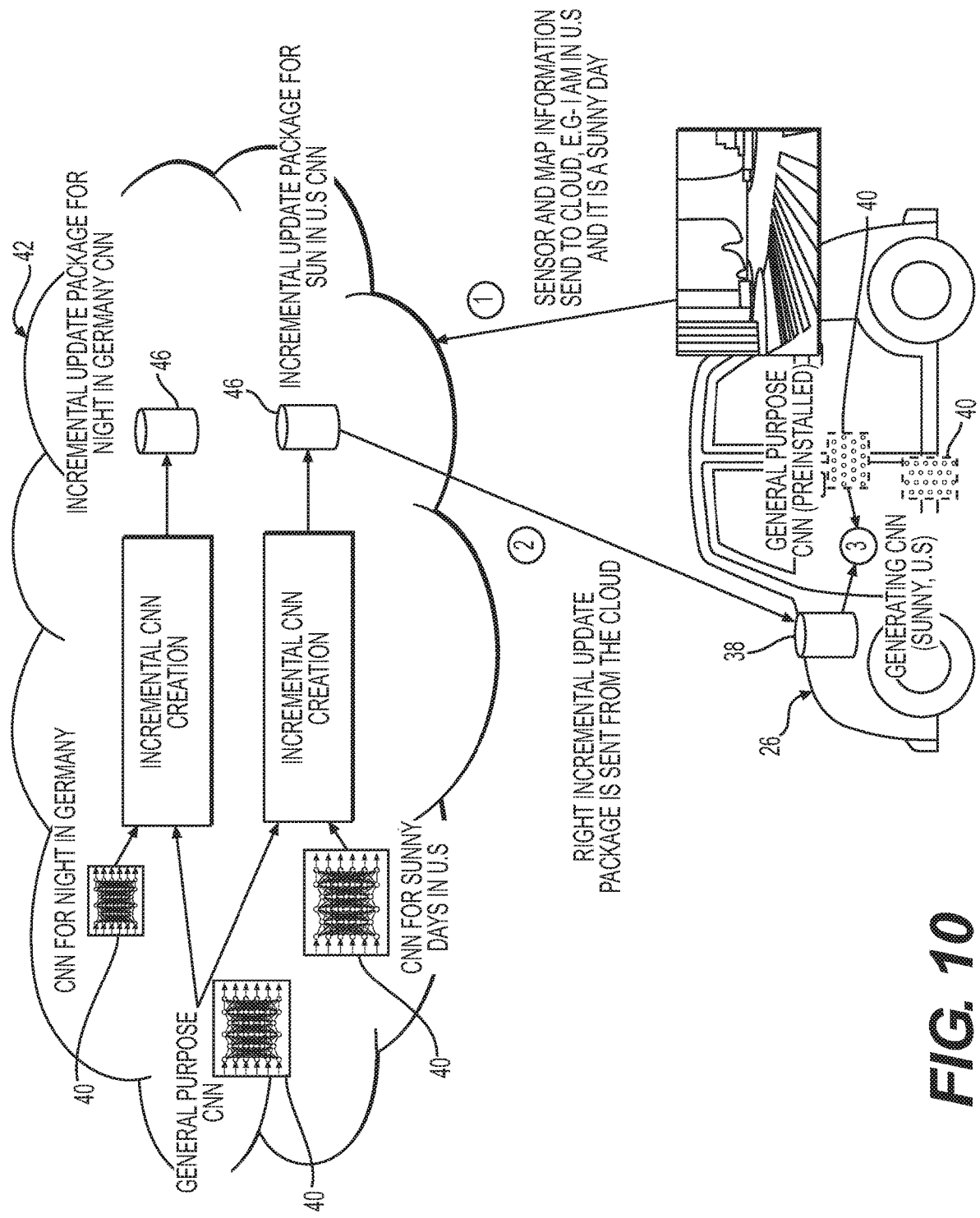
FIG. 10 illustrates a vehicle in communication with a server disposed remotely from the vehicle for incremental updates of the at least one particularized convolutional neural network according to aspects of the disclosure.

According to an aspect of the disclosure, incremental updates can be applied to the at least one of the particularized convolutional neural network 40. Such incremental updates are commonly used for navigation, wherein digital maps can be updated by applying variants of binary diff operations or by exploiting the structure of the database. Concepts used for updating navigation databases can be re-used for updating neural network data structures and even programs. So, for example, the incremental update could be binary based (i.e., without exploiting the structure of the CNN) or structural based (i.e., with exploiting the structure of the CNN). The plurality of particularized convolutional neural networks 40 which are required for the various situations might only differ slightly. For instance, the underlying network structure of the at least one particularized convolutional neural network 40 stays the same (e.g., one of the networks described above can be utilized). In order to adapt the at least one particularized convolutional neural network 40 to the various environmental situations, the weights and biases of those structures are adapted. For example, 90% of these parameters may stay the same between the plurality of particularized convolutional neural networks 40. As each the plurality of particularized convolutional neural networks 40 could be up to Mbyte in size, it would be beneficial to transmit only the delta information from the server 42 to the vehicle 26. The vehicle processor 36 could then apply this delta information on an already existing one of the plurality of particularized convolutional neural networks 40 to create the one of the plurality of particularized convolutional neural networks 40 that is tailor-made. This approach would save bandwidth. As this approach is quite similar to incremental map update techniques introduced for map update can be used. For instance, a straightforward binary diff between programs and configuration files can be used. FIG. 10 depicts this idea.

In more detail, in the vehicle memory unit 38 and in the cloud (i.e., server memory unit 46), a general purpose CNN can be stored, which is not optimal but this general purpose CNN can be used as fallback and as reference for highly specific CNNs. After creating the special purpose CNNs, "incremental CNN updates" between these CNNs can be created and the fallback CNN. Similar to incremental map updates, these incremental updates might be created based on binary diff or semantic/structural diff (CNN weight values encoded in protobuf). The vehicle processor 36 can generate a new one of the plurality of particularized convolutional neural networks 40 or CNN by applying this delta to the general purpose CNN. Alternatively, the delta information could be stored in the pre-installed scenario and generate the appropriate CNNs on the fly if storage on the vehicle memory unit 38 is limited).

Figure 11:
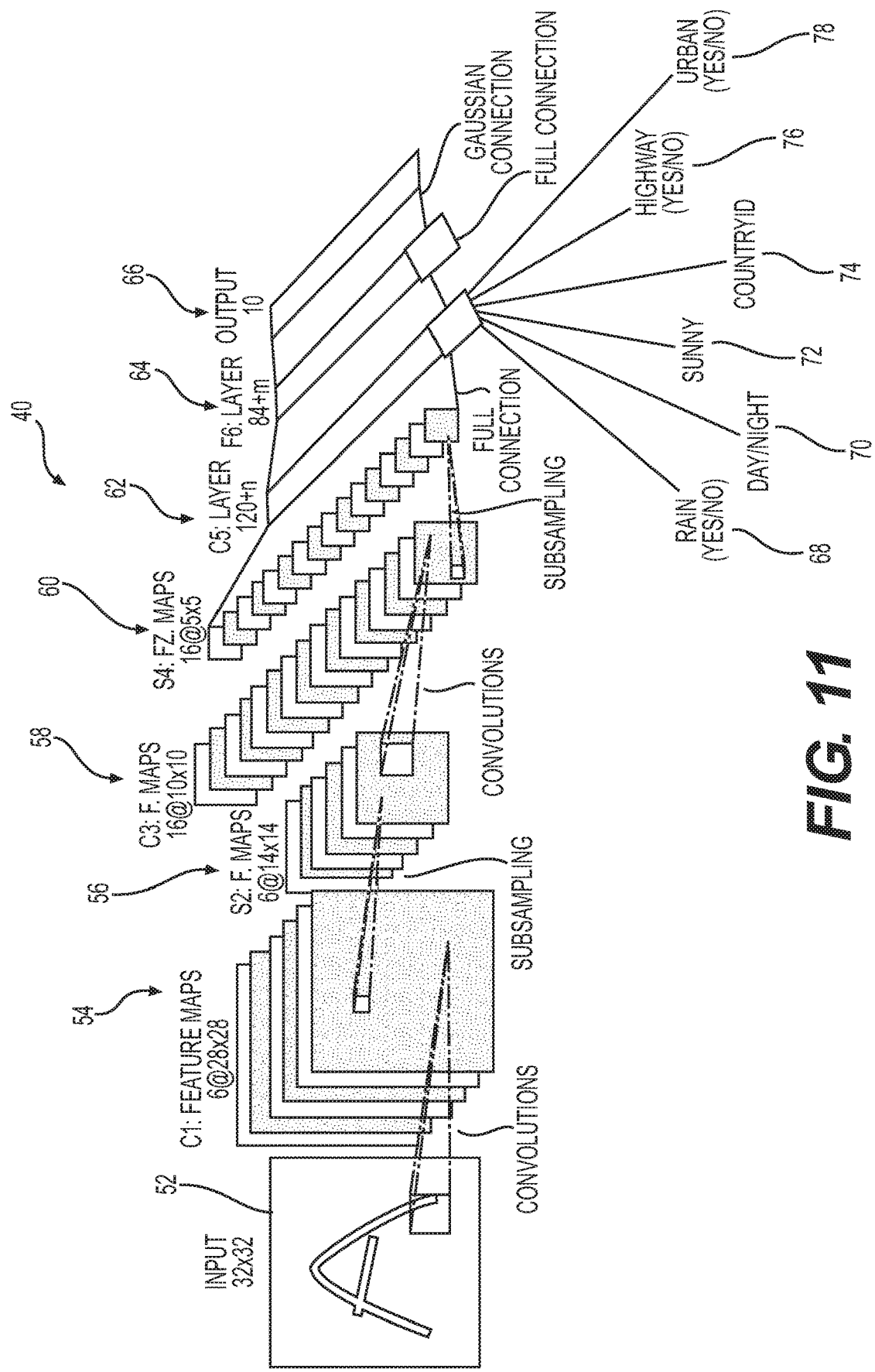
FIG. 11 illustrates the at least one particularized convolutional neural network having a LeNet-5 architecture according to aspects of the disclosure.
Figure 12:
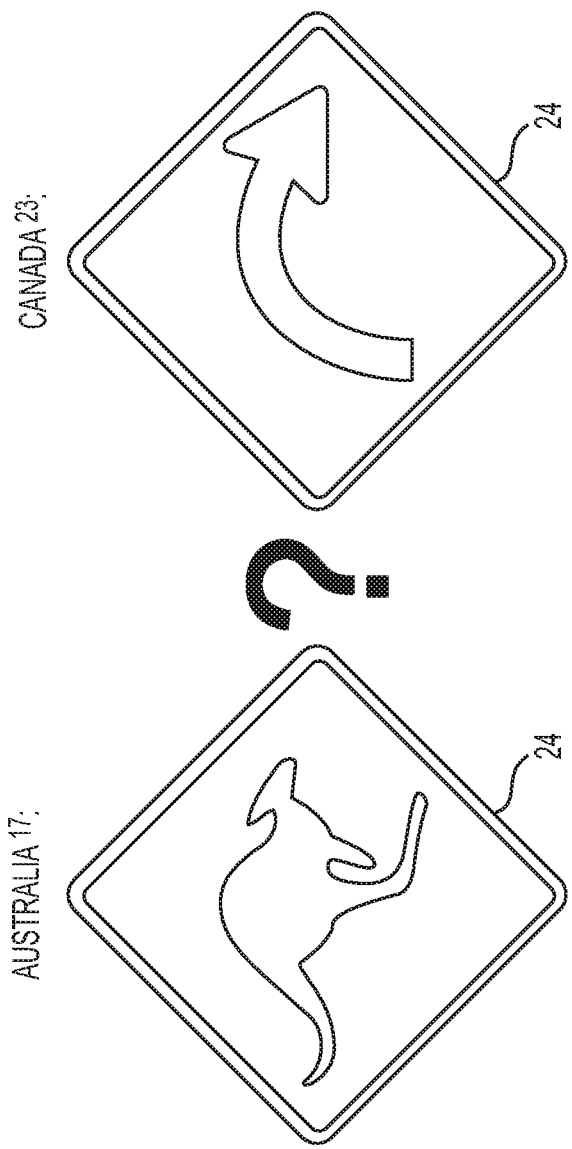
FIG. 12 illustrates an "animal crossing" traffic sign and a "dangerous curve ahead" traffic sign according to aspects of the disclosure.

According to an aspect, the at least one particularized convolutional neural network 40 can have the architecture shown in FIG. 11 (known as LeNet-5). The particularized convolutional neural network 40 of FIG. 11, could, for example, be used instead of the plurality of particularized convolutional neural networks 40 selected based on day or night, rain detection, and/or location data. The first layers 52, 54, 56, 58 dealing with convolutions and subsampling are tailor-made for image processing and allow to detect and classify objects in an image (i.e., image data) independent of their spatial location. The last layers 60, 62, 64, 66 are traditional neural networks. Specifically, the at least one particularized convolutional neural network 40 can include a plurality of layers 52, 54, 56, 58, 60, 62, 64, 66 including an input layer 52 and a first convolutional layer 54 coupled to the input layer 52 and a first subsample layer 56 coupled to the first convolutional layer 54. The plurality of layers 52, 54, 56, 58, 60, 62, 64, 66 can also include a second convolutional layer 58 coupled to the first subsample layer 56 and a second subsample layer 60 coupled to the second convolutional layer 58 and a third convolutional layer 62 coupled to the second subsample layer 60 and a fully connected layer 64 coupled to the a third convolutional layer 62 and an output layer 66 coupled to the fully connected layer 64. It should be understood that although the at least one particularized convolutional neural network 40 can be as described as set forth above, other arrangements of the at least one particularized convolutional neural network 40 are possible.

New inputs 68, 70, 72, 74, 76, 78 or input channels for the environmental information to the neural network are added and this new input information to the neural network does not come directly from the image. Therefore the at least one particularized convolutional neural network 40 can use this information to learn more efficiently how to classify, detect and localize objects in various environmental and regional situations. So, the third convolutional layer 62 includes a rain input 68 and a time of day input 70 and a sunny input 72 and a country identification input 74 and a type of road input 76 and a type of area input 78 to use in the at least one particularized convolutional neural network 40.

Figure 13:
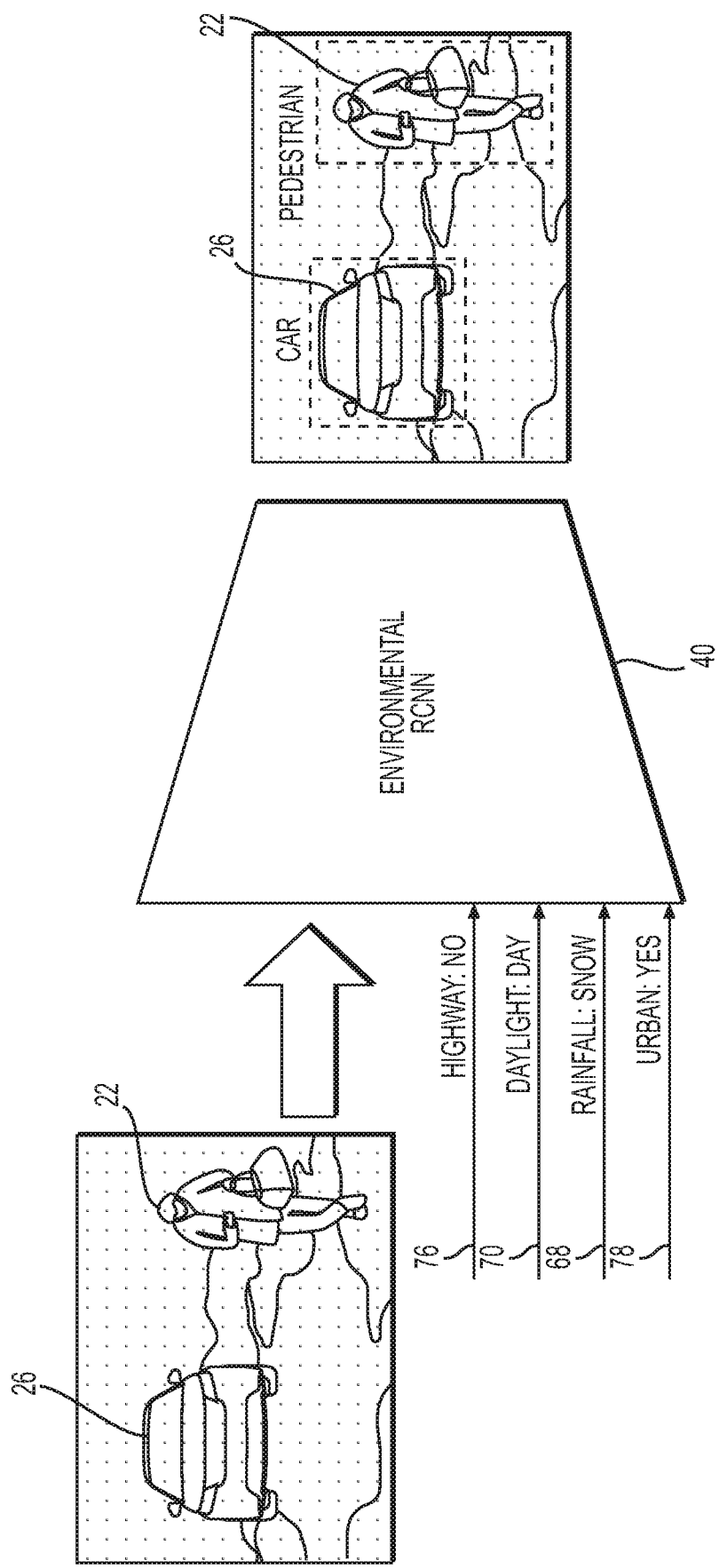
FIGS. 13 and 14 illustrate sending image data and data from the plurality of environmental sensors to at least one particularized convolutional neural network for object detection, classification and localization according to aspects of the disclosure.
Figure 14:
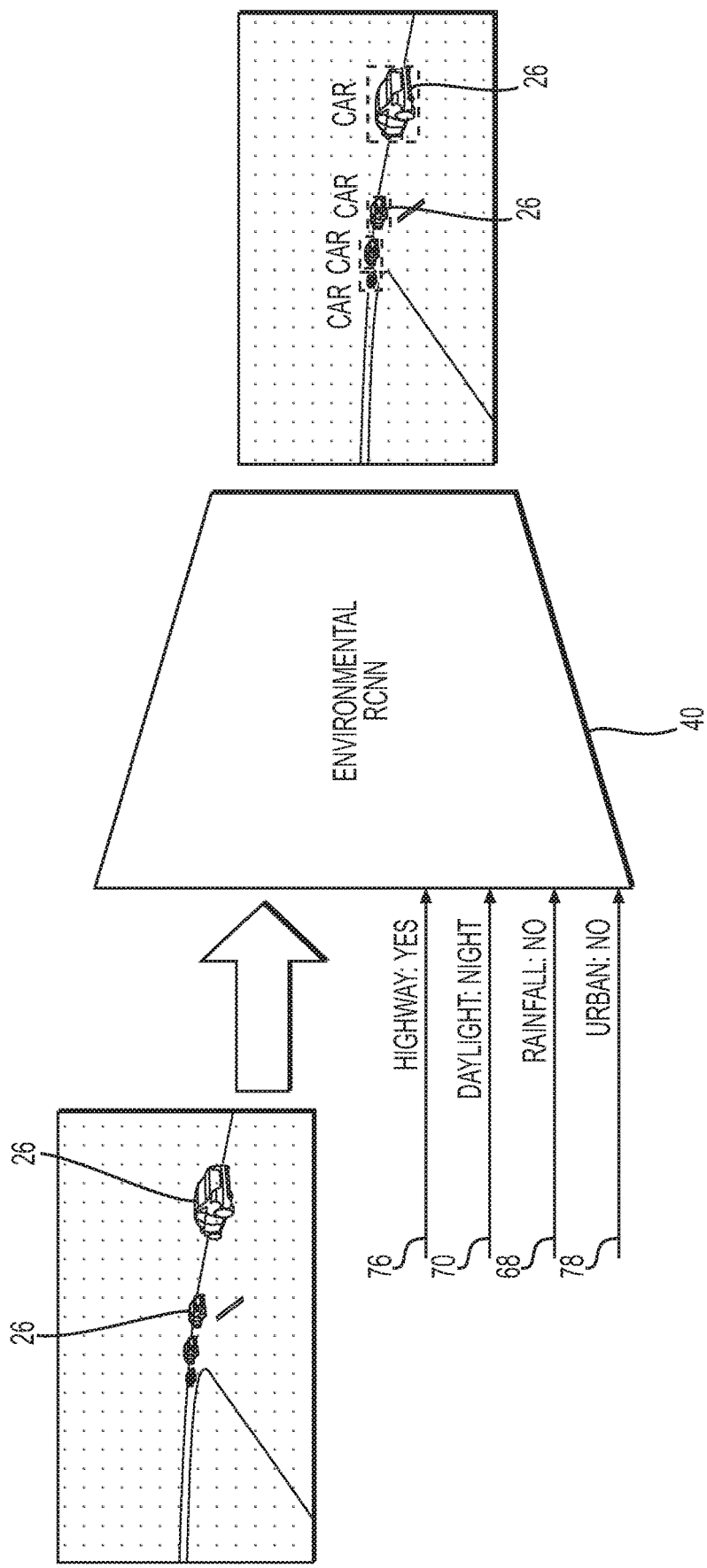
Figure 15:
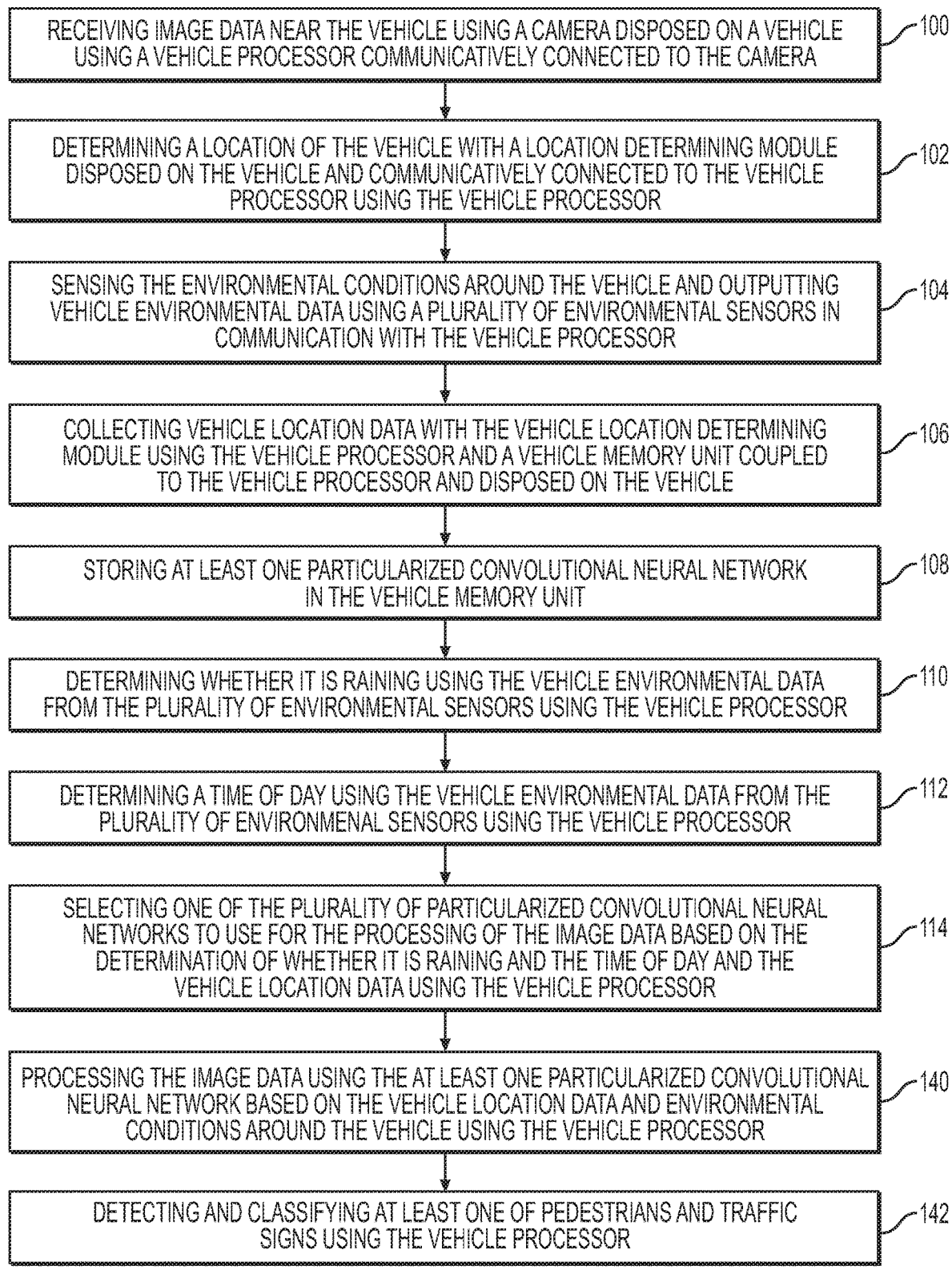
FIGS. 15, 16A-16B, 17A-17B, and 18 illustrate steps of a method for detecting and classifying pedestrians and traffic signs and other vehicles according to aspects of the disclosure.
Figure 16A:
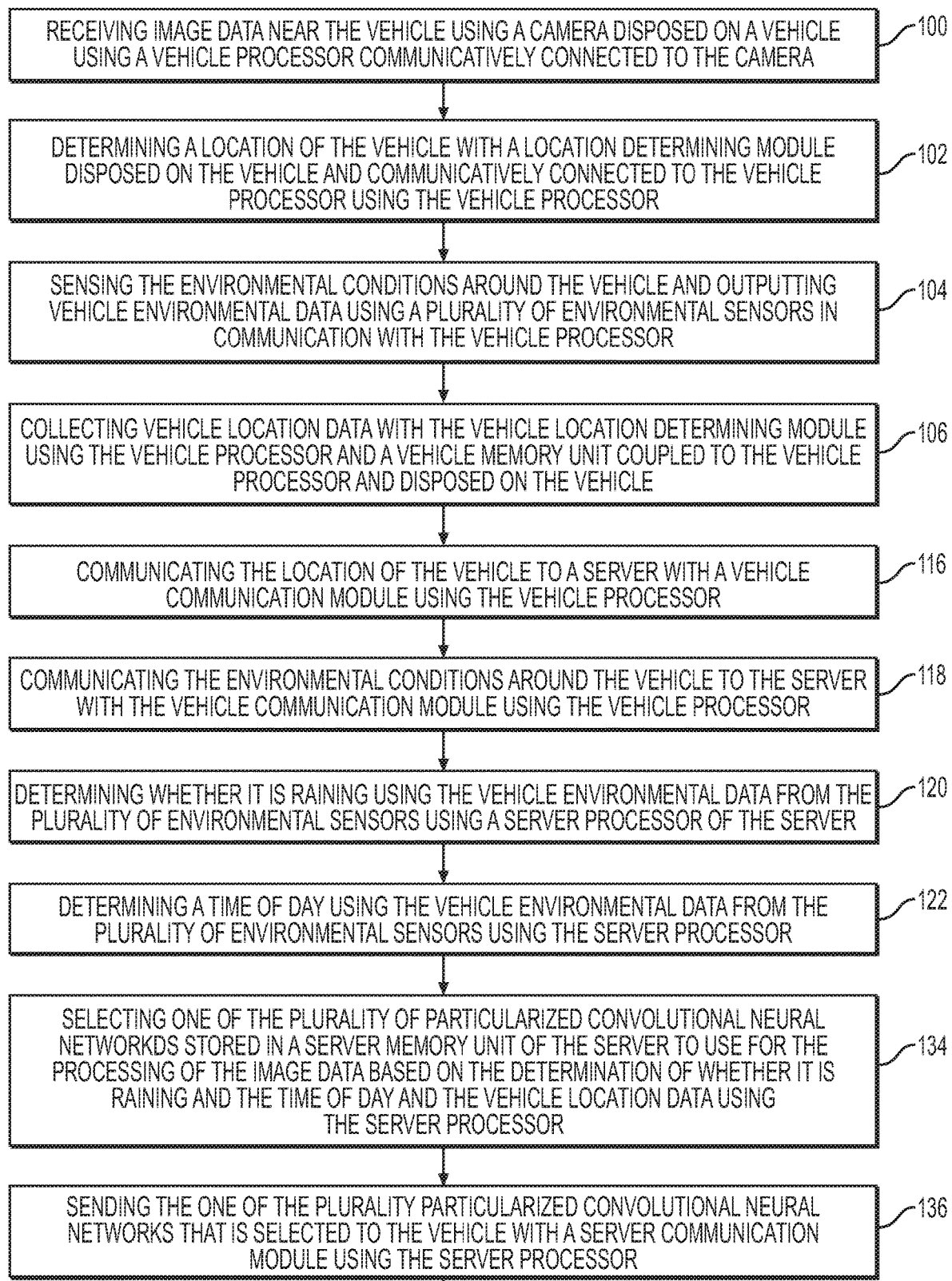
Figure 16B:
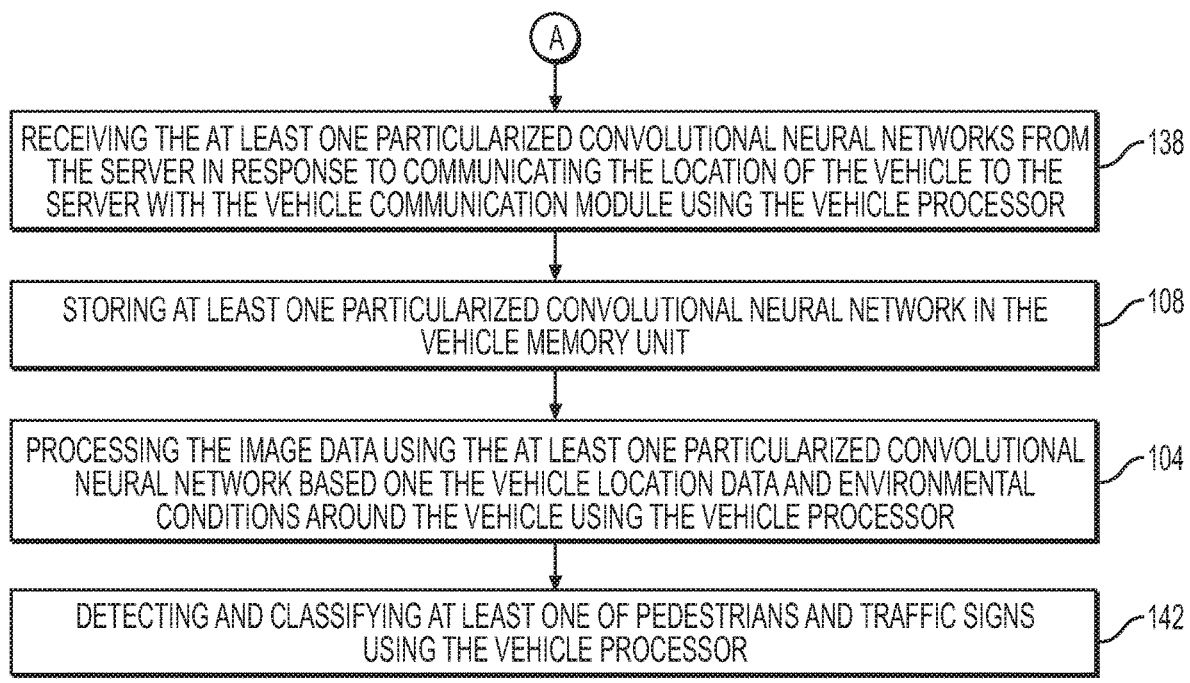
Figure 17A:
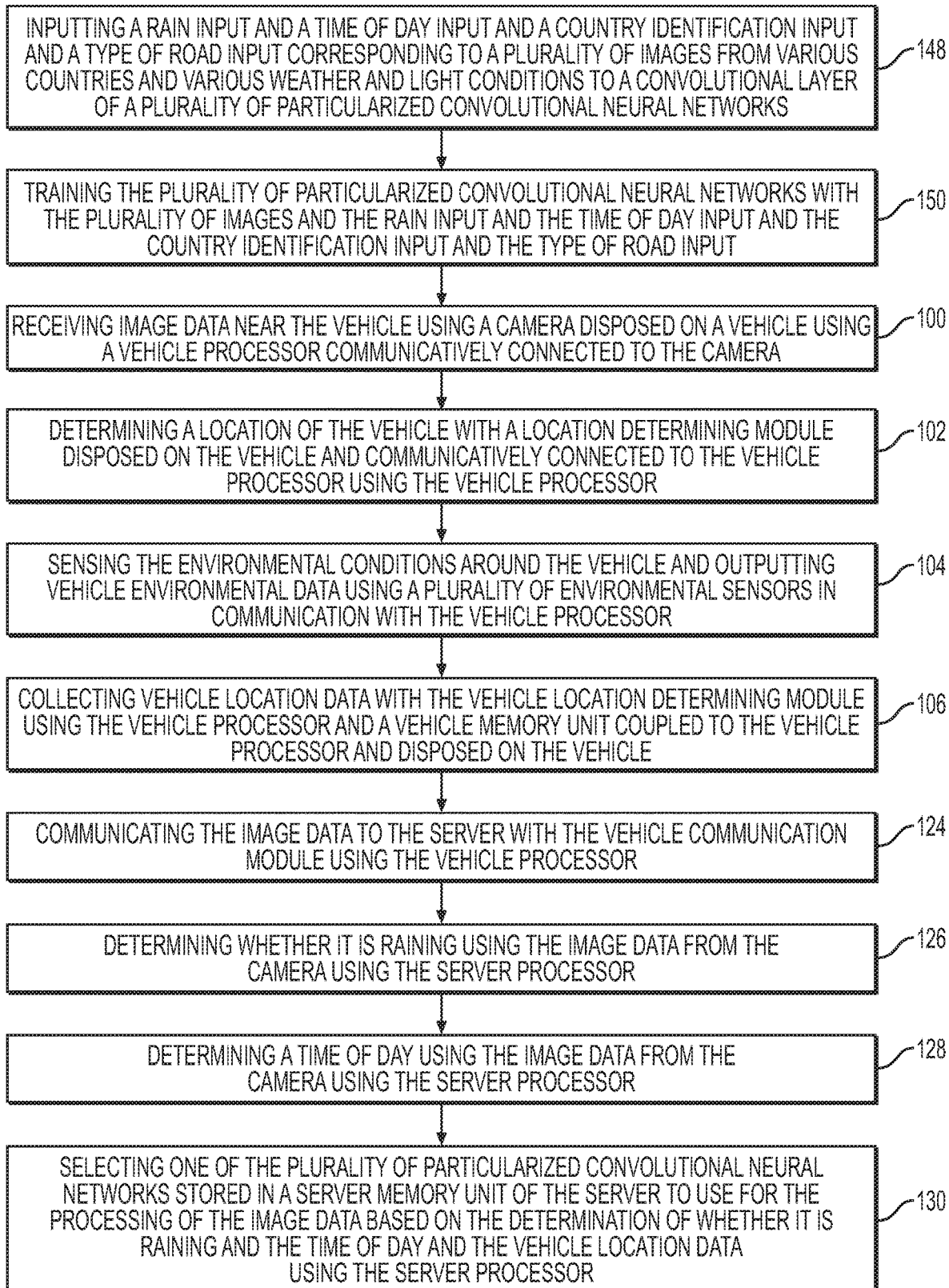
Figure 17B:
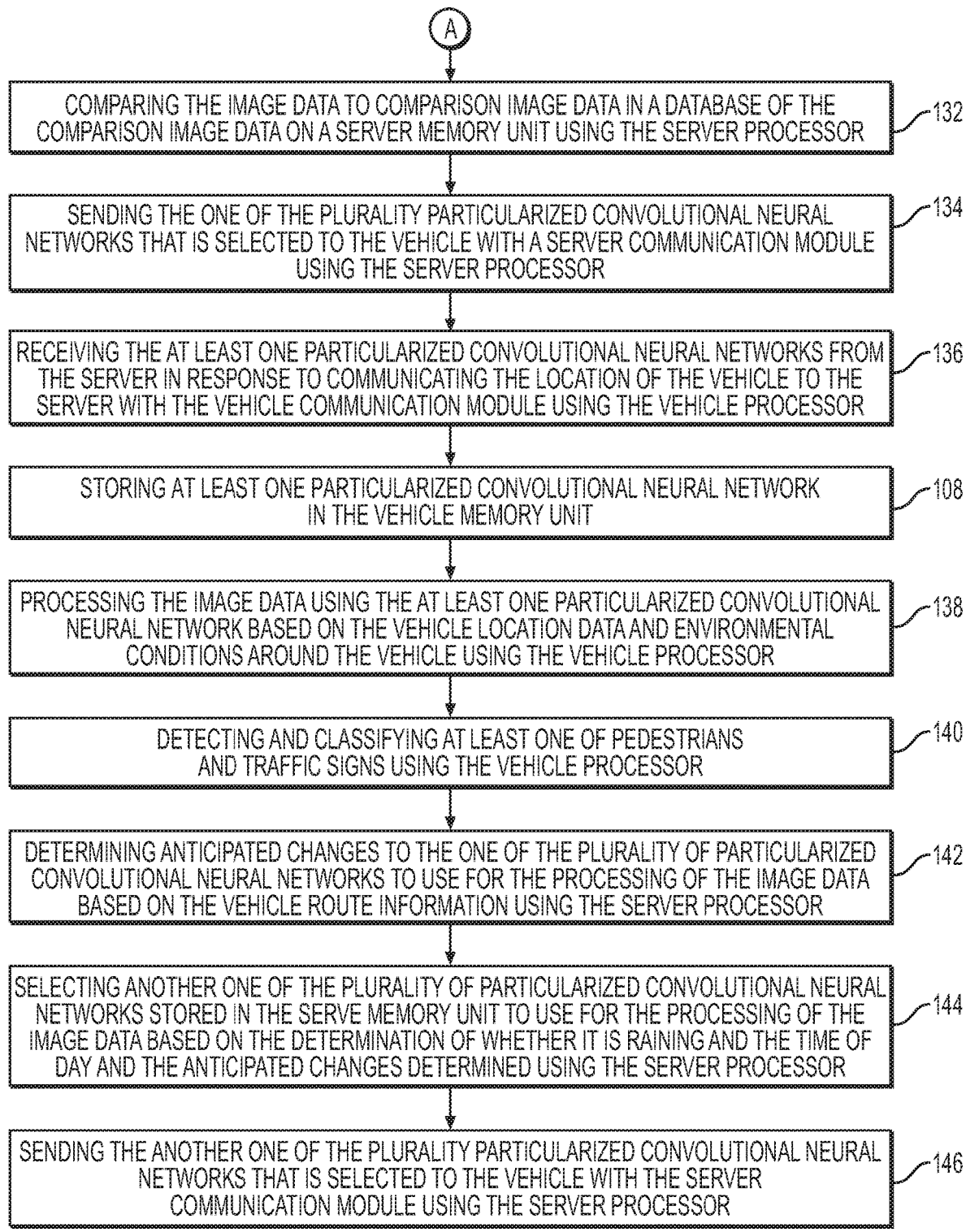
Figure 18:
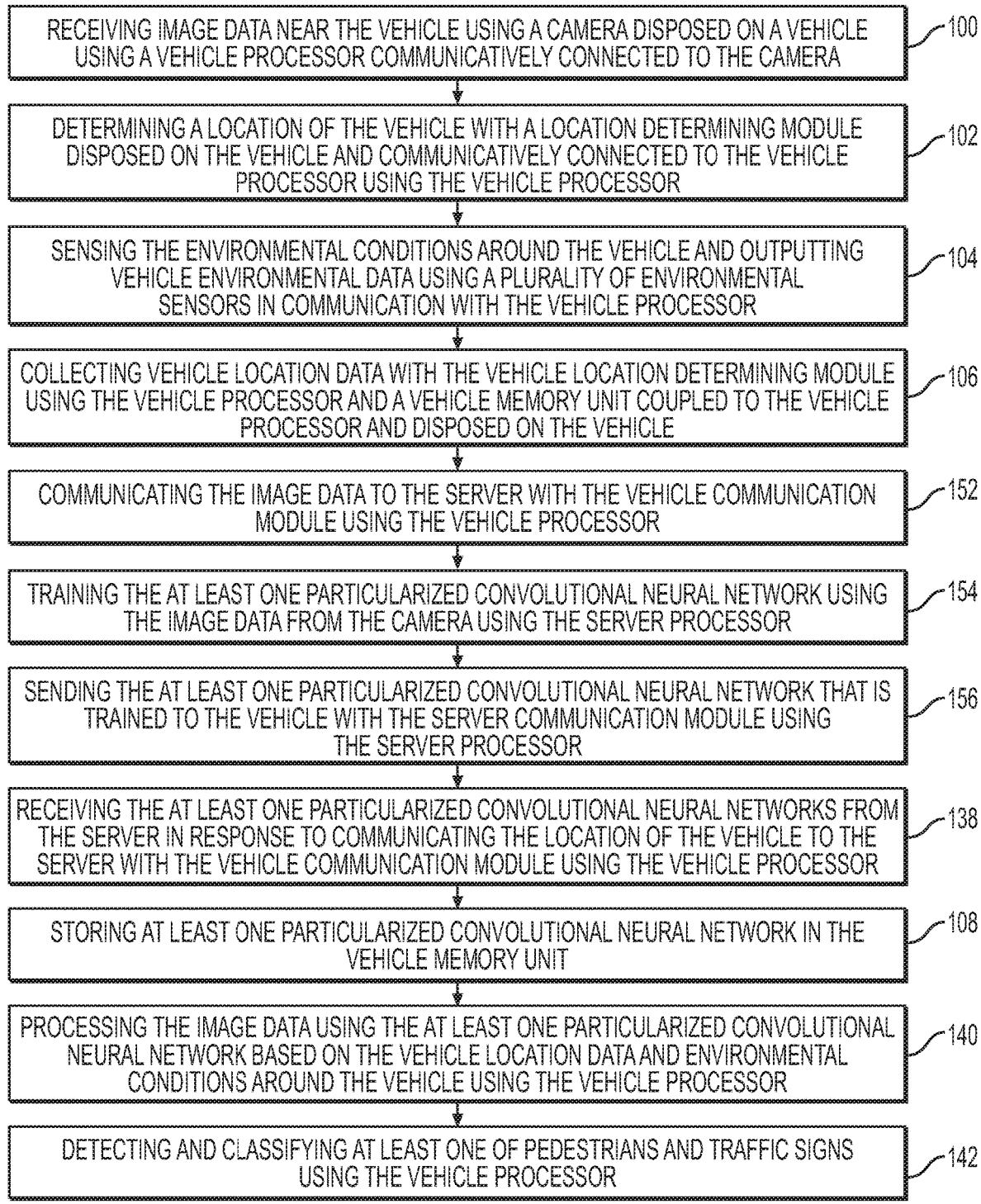

For instance, if the at least one particularized convolutional neural network 40 is not sure whether a certain traffic sign 24 means "animal crossing" or "dangerous curve ahead" (FIG. 12), it might be helpful to know which country the vehicle 26 is currently in. Taking the country input additionally into account, the likelihood of classifying traffic sign 24 correctly is increased considerably. Similarly, the at least one particularized convolutional neural network 40 might benefit from day/night and rain/sun information for detecting vehicles 26 (FIGS. 13 and 14). During night and rain, features like vehicle lights might be weighted higher than during a sunny or cloudy day when the at least one particularized convolutional neural network 40 relies more on shape. Providing this additional environmental information can be regarded as sensor fusion done by the at least one particularized convolutional neural network 40. The neural network will learn whether environmental information is helpful for classification or can be neglected.

In addition, it should also be appreciated that it is also possible to combine some of the arrangements and variations described above. For instance, the plurality of particularized convolutional neural networks 40 that are region-specific (for the US, for Germany, etc.) can be augmented with sensor information coming from the plurality of environmental sensors 32, 34 (e.g., Rain/Snow/Day/Night sensors).

The at least one particularized convolutional neural network 40 can be trained with images from various countries, various weather and light conditions, etc. The labeling of the images is not changed (e.g., the images are still labeled with bounding boxes and class IDs as, for instance, a vehicle 26, pedestrian 22, type of traffic sign 24, etc.). Not only is the image data used for as input for training, but also the environmental information (e.g., snow, rain, urban, highway, country ID, etc.). This information needs to be available for each image and might have to be provided by humans or could have been recorded together with the image data from the camera 28.

As best shown in FIGS. 15, 16A-16B, 17A-17B, and 18 a method for detecting and classifying pedestrians 22 and traffic signs 24 and other vehicles 26 is also provided. The method includes the step of 100 receiving image data near the vehicle 26 using a camera 28 disposed on a vehicle 26 using a vehicle processor 36 communicatively connected to the camera 28. The method continues with the step of 102 determining a location of the vehicle 26 with a location determining module 30 disposed on the vehicle 26 and communicatively connected to the vehicle processor 36 using the vehicle processor 36. The method may also include the step of 104 sensing the environmental conditions around the vehicle 26 and outputting vehicle environmental data using a plurality of environmental sensors 32, 34 in communication with the vehicle processor 36. The method proceeds by 106 collecting vehicle location data with the location determining module 30 using the vehicle processor 36 and a vehicle memory unit 38 coupled to the vehicle processor 36 and disposed on the vehicle 26. The method also includes the step of 108 storing at least one particularized convolutional neural network 40 in the vehicle memory unit 38.

As discussed above, the at least one particularized convolutional neural network 40 can include a plurality of particularized convolutional neural networks 40. According to an aspect of the disclosure, the plurality of particularized convolutional neural networks 40 can be stored on the vehicle memory unit 38. In such a case, the method can include 110 determining whether it is raining using the vehicle environmental data from the plurality of environmental sensors 32, 34 using the vehicle processor 36. The method can also include 112 determining a time of day using the vehicle environmental data from the plurality of environmental sensors 32, 34 using the vehicle processor 36. Also, when the at least one particularized convolutional neural network 40 includes a plurality of particularized convolutional neural networks 40, the method can include the step of 114 selecting one of the plurality of particularized convolutional neural networks 40 to use for the processing of the image data based on the determination of whether it is raining and the time of day and the vehicle location data using the vehicle processor 36.

Alternatively, the plurality of particularized convolutional neural networks 40 can be stored in the cloud (e.g., on the server 42). Thus, the method can include the steps of 116 communicating the location of the vehicle 26 to a server 42 with a vehicle communication module 50 using the vehicle processor 36 and 118 communicating the environmental conditions around the vehicle 26 to the server 42 with the vehicle communication module 50 using the vehicle processor 36. The method can also include the step of 120 determining whether it is raining using the vehicle environmental data from the plurality of environmental sensors 32, 34 using a server processor 44 of the server 42. The method may continue by 122 determining a time of day using the vehicle environmental data from the plurality of environmental sensors 32, 34 using the server processor 44.

While the environmental conditions can be communicated to the server 42 directly, the server 42 may also be able to determine the environmental conditions based on the image data. Therefore, the method can include the step of 124 communicating the image data to the server 42 with the vehicle communication module 50 using the vehicle processor 36. The method continues with the steps of 126 determining whether it is raining using the image data from the camera 28 using the server processor 44 and 128 determining a time of day using the image data from the camera 28 using the server processor 44.

Whether the vehicle processor 36 or the server processor 44 determines the environmental conditions, the method can also include the step of 130 selecting one of the plurality of particularized convolutional neural networks 40 stored in a server memory unit 46 of the server 42 to use for the processing of the image data based on the determination of whether it is raining and the time of day and the vehicle location data using the server processor 44. In more detail, the step of 130 selecting one of the plurality of particularized convolutional neural networks 40 to use for the processing of the image data may include 132 comparing the image data to comparison image data in a database of the comparison image data on a server memory unit 46 using the server processor 44.

The method can additionally include the step of 134 sending the one of the plurality particularized convolutional neural networks 40 that is selected to the vehicle 26 with a server communication module 48 using the server processor 44. Then, the method can include the step of 136 receiving the at least one particularized convolutional neural networks 40 from the server 42 in response to communicating the location of the vehicle 26 to the server 42 with the vehicle communication module 50 using the vehicle processor 36.

The method continues with 138 processing the image data using the at least one particularized convolutional neural network 40 based the vehicle location data and environmental conditions around the vehicle 26 using the vehicle processor 36. The method then includes the step of 140 detecting and classifying at least one of pedestrians 22 and traffic signs 24 using the vehicle processor 36. So, similar to the process depicted in FIGS. 13 and 14, the image data from the camera 28 along with location data (e.g., country, highway, urban, etc.) and data from the plurality of environmental sensors 32, 34 (e.g., day/night, rain/snow/dry etc.) can be sent to at least one particularized convolutional neural network 40. Based on this information, the at least one particularized convolutional neural network 40 carries out object detection, classification and localization.

Because the vehicle 26 location data can include route information, the method can also include the step of 142 determining anticipated changes to the one of the plurality of particularized convolutional neural networks 40 to use for the processing of the image data based on the vehicle route information using the server processor 44. The method can also continue by 144 selecting another one of the plurality of particularized convolutional neural networks 40 stored in the server memory unit 46 to use for the processing of the image data based on the determination of whether it is raining and the time of day and the anticipated changes determined using the server processor 44. Then, the method can include the step of 146 sending the another one of the plurality particularized convolutional neural networks 40 that is selected to the vehicle 26 with the server communication module 48 using the server processor 44.

In order for the at least one particularized convolutional neural network 40 to be used in the vehicle 26, it is trained. Accordingly, the method can include the step of 148 inputting a rain input 68 and a time of day input 70 and a country identification input 74 and a type of road input 76 corresponding to a plurality of images from various countries and various weather and light conditions to a convolutional layer of a plurality of particularized convolutional neural networks 40. The method can also include the step of 150 training the plurality of particularized convolutional neural networks 40 with the plurality of images and the rain input 68 and the time of day input 70 and the country identification input 74 and the type of road input 76. As mentioned above, it should be understood that the at least one particularized convolutional neural network 40 can have various layers 52, 54, 56, 58, 60, 62, 64, 66 and structures and therefore, the training of the at least one particularized convolutional neural network 40 can be carried out using different or additional steps.

As previously discussed, the server processor 44 can also be configured to train the at least one particularized convolutional neural network 40 "on-the-fly." So, the method can also include the step of 152 communicating the image data to the server 42 with the vehicle communication module 50 using the vehicle processor 36. Next, 154 training the at least one particularized convolutional neural network 40 using the image data from the camera 28 using the server processor 44. The method can also continue with the step of 156 sending the at least one particularized convolutional neural network 40 that is trained to the vehicle 26 with the server communication module 48 using the server processor 44.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors (e.g., voice processor or classification processor). A computer storage medium (e.g., the data store of the voice user interface module 24) can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Obviously, many modifications and variations of the claimed invention are possible in light of the above teachings and may be practiced otherwise than as specifically described while within the scope of the appended claims.

These antecedent recitations should be interpreted to cover any combination in which the inventive novelty exercises its utility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

We claim:

1. A system for a vehicle, comprising:
  a camera disposed on the vehicle for receiving image data near the vehicle;
  a location determining module disposed on the vehicle to determine a location of the vehicle;
  one or more environmental sensors disposed on the vehicle configured to sense environmental conditions around the vehicle;
  a vehicle memory unit disposed on the vehicle for storing at least one particularized convolutional neural network to process the image data;
  a vehicle processor disposed on the vehicle and communicatively coupled to the vehicle memory unit and the camera and the location determining module and configured to:
    collect vehicle location data with the location determining module;
    process the image data using the at least one particularized convolutional neural network based on the vehicle location data and the environmental conditions around the vehicle to detect and classify at least one object within a range of the vehicle;
    communicate the location of the vehicle and the environmental conditions around the vehicle to a server, wherein the server includes a plurality of particularized convolutional neural networks and wherein the server selects one of the plurality of particularized convolutional neural networks to use for the processing of the image data based on the environmental conditions around the vehicle and the vehicle location data; and
    receive the at least one particularized convolutional neural network from the server in response to communicating the location of the vehicle and the environmental conditions around the vehicle to the server.

2. The system as set forth in claim 1, wherein the one or more environmental sensors are configured to output vehicle environmental data.

3. The system as set forth in claim 2, wherein the at least one particularized convolutional neural network includes a plurality of particularized convolutional neural networks and wherein the vehicle processor is further configured to:
  determine whether it is raining using the vehicle environmental data from the one or more environmental sensors,
  determine a time of day using the vehicle environmental data from the one or more environmental sensors, and select one of the plurality of particularized convolutional neural networks to use for the processing of the image data based on the determination of whether it is raining and the time of day and the vehicle location data.

4. The system as set forth in claim 2, wherein the server is configured to:
determine whether it is raining using the vehicle environmental data from the one or more environmental sensors,
determine a time of day using the vehicle environmental data from the one or more environmental sensors.

5. The system as set forth in claim 4 wherein the server is configured to select the one of the plurality of particularized convolutional neural networks to use for the processing of the image data based on the determination of whether it is raining, the time of day, and the vehicle location data.

6. The system as set forth in claim 5, wherein the vehicle location data includes vehicle route information and the server is configured to:
determine anticipated changes to the one of the plurality of particularized convolutional neural networks to use for the processing of the image data based on the vehicle route information,
select another one of the plurality of particularized convolutional neural networks to use for the processing of the image data based on the determination of whether it is raining, the time of day, and the anticipated changes determined, and
send the another one of the plurality particularized convolutional neural networks that is selected to the vehicle.

7. The system as set forth in claim 4, wherein the vehicle processor is configured to communicate the image data to the server and wherein the server is configured to:
determine whether it is raining using the image data from the camera,
determine a time of day using the image data from the camera,
select the one of the plurality of particularized convolutional neural networks to use for the processing of the image data based on the determination of whether it is raining, the time of day, and the vehicle location data.

8. The system as set forth in claim 7, wherein the server includes a database of comparison image data and the selection of the one of the plurality of particularized convolutional neural networks to use for the processing of the image data by the server includes comparing the image data to the comparison image data.

9. The system as set forth in claim 4, wherein the vehicle processor is configured to communicate the image data to the server and wherein the server is configured to:
train the at least one particularized convolutional neural network using the image data from the camera, and
send the at least one particularized convolutional neural network that is trained to the vehicle processor.

10. The system as set forth in claim 1, wherein the at least one particularized convolutional neural network includes a plurality of layers including an input layer and a first convolutional layer coupled to the input layer and a first subsample layer coupled to the first convolutional layer and a second convolutional layer coupled to the first subsample layer and second subsample layer coupled to the second convolutional layer and a third convolutional layer coupled to the second subsample layer and a fully connected layer coupled to the a third convolutional layer and an output layer coupled to the fully connected layer and the third convolutional layer includes a rain input and a time of day input and a sunny input and a country identification input and a type of road input and a type of area input to use in the at least one particularized convolutional neural network.

11. A method for detecting and classifying pedestrians and traffic signs and other vehicles, comprising the steps of:
receiving, by a vehicle processor, image data near the vehicle from a camera disposed on the vehicle;
determining, by the vehicle processor, a location of the vehicle;
collecting, by the vehicle processor, vehicle location data;
storing, at a vehicle memory unit coupled to the vehicle processor, at least one particularized convolutional neural network in the vehicle memory unit;
receiving, by the vehicle processor, environmental conditions around the vehicle from one or more environmental sensors disposed on the vehicle;
communicating the environmental conditions around the vehicle to a server the vehicle processor;
determining, by the server, whether it is raining using the environmental conditions;
determining, by the server, a time of day using the environmental conditions;
selecting, by the server, one of a plurality of particularized convolutional neural networks stored on the server to use for the processing of the image data based on the determination of whether it is raining, the time of day, and the vehicle location data;
communicating, by the server, the one of the plurality particularized convolutional neural networks to the vehicle processor;
processing, by the at least one particularized convolutional neural network, the image data based the vehicle location data and the environmental conditions around the vehicle using the vehicle processor; and
detecting and classifying, by the vehicle processor, at least one of pedestrians and traffic signs and other vehicles.

12. The method as set forth in claim 11, wherein the at least one particularized convolutional neural network includes a plurality of layers.

13. The method as set forth in claim 12, wherein the plurality of layers includes:
an input layer;
a first convolutional layer coupled to the input layer;
a first subsample layer coupled to the first convolutional layer;
a second convolutional layer coupled to the first subsample layer;
second subsample layer coupled to the second convolutional layer;
a third convolutional layer coupled to the second subsample layer;
a fully connected layer coupled to the a third convolutional layer; and
an output layer coupled to the fully connected layer.

14. A system for a vehicle, comprising:
a vehicle processor; and
a memory that stores instructions that, when executed by the vehicle processor, cause the vehicle processor to:
receive, from a camera of the vehicle, image data;
generate vehicle location data corresponding to a location of the vehicle;
receive, from one or more environmental sensors of the vehicle, environmental data corresponding to environmental conditions sensed proximate the vehicle;
communicate the vehicle location data and the environmental data to a server, wherein the server includes a plurality of particularized convolutional neural networks and wherein the server is configured to:
  determine whether it is raining using the vehicle environmental data;
  determine a time of day using the vehicle environmental data; and
  select one of the plurality of particularized convolutional neural networks to based on the determination of whether it is raining, the time of data, and the vehicle location data;
  receive the at least one particularized convolutional neural network from the server; and
  process the image data using the at least one particularized convolutional neural network based on the vehicle location data and the environmental data to detect and classify at least one object within a range of the vehicle.

15. The system as set forth in claim 14, wherein the vehicle location data includes vehicle route information and the server is configured to:
  determine anticipated changes to the one of the plurality of particularized convolutional neural networks based on the vehicle route information,
  select another one of the plurality of particularized convolutional neural networks based on the determination of whether it is raining, the time of day, and the anticipated changes determined, and
  communication the another one of the plurality particularized convolutional neural networks that is selected to the vehicle processor.

16. The system as set forth in claim 14, wherein the server includes a database of comparison image data and the selection of the one of the plurality of particularized convolutional neural networks by the server includes comparing the image data to the comparison image data.

17. The system as set forth in claim 14, wherein the service is configured to
  receive the image data;
  train the at least one particularized convolutional neural network using the image data; and
  communicate the at least one particularized convolutional neural network that is trained to the vehicle processor.

18. The system as set forth in claim 14, wherein the at least one particularized convolutional neural network includes a plurality of layers.

19. The system as set forth in claim 18, wherein the plurality of layers includes:
  an input layer;
  a first convolutional layer coupled to the input layer;
  a first subsample layer coupled to the first convolutional layer;
  a second convolutional layer coupled to the first subsample layer;
  second subsample layer coupled to the second convolutional layer;
  a third convolutional layer coupled to the second subsample layer;
  a fully connected layer coupled to the a third convolutional layer; and
  an output layer coupled to the fully connected layer.

20. The system as set forth in claim 19, wherein the third convolutional layer includes a rain input; a time of day input; a sunny input, a country identification input, a type of road input, and a type of area input to use in the at least one particularized convolutional neural network.

* * * * *